(12) United States Patent
Bar-on

(10) Patent No.: US 11,568,368 B2
(45) Date of Patent: Jan. 31, 2023

(54) CLASSIFICATION ENGINE INSTANCE INFORMING PARSING OF EMAILS RECEIVED BY AN EMAIL CLIENT INSTANCE EXECUTED BY A MOBILE DEVICE

(71) Applicants: Atlassian Pty Ltd., Sydney (AU); Atlassian Inc., San Francisco, CA (US)

(72) Inventor: Noam Bar-on, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/085,774

(22) Filed: Oct. 30, 2020

(65) Prior Publication Data

US 2021/0406836 A1    Dec. 30, 2021

Related U.S. Application Data

(60) Provisional application No. 63/046,442, filed on Jun. 30, 2020.

(51) Int. Cl.
*G06F 40/205*  (2020.01)
*G06Q 10/10*  (2012.01)
*H04L 51/42*  (2022.01)

(52) U.S. Cl.
CPC ......... *G06Q 10/107* (2013.01); *G06F 40/205* (2020.01); *H04L 51/42* (2022.05)

(58) Field of Classification Search
CPC ...... G06Q 10/107; G06F 40/205; H04L 51/22
USPC ......................................................... 709/206
See application file for complete search history.

(56) References Cited

U.S. PATENT DOCUMENTS

| | | | |
|---|---|---|---|
| 2013/0268839 A1* | 10/2013 | Lefebvre | G06Q 10/107 715/254 |
| 2016/0197993 A1* | 7/2016 | Perkowski | H04L 67/02 709/203 |
| 2019/0273665 A1* | 9/2019 | Polinati | G06F 16/285 |

* cited by examiner

*Primary Examiner* — Sibte H Bukhari
(74) *Attorney, Agent, or Firm* — Brownstein Hyatt Farber Schreck, LLP

(57) ABSTRACT

A system in which existing email protocols are leveraged to exchange information between two or more client devices. In some examples, a trained classifier can be leveraged to apply a label or classification to a received email. Based on the classification of the email, one or more parsers can be selected which can output data to be displayed in a dedicated portion of a graphical user interface.

19 Claims, 26 Drawing Sheets

CLASSIFICATION ENGINE INSTANCE INFORMING PARSING OF EMAILS RECEIVED BY AN EMAIL CLIENT INSTANCE EXECUTED BY A MOBILE DEVICE

CROSS-REFERENCE TO RELATED APPLICATION(S)

This application is a nonprovisional of, and claims the benefit under 35 U.S.C. § 119 of, U.S. Provisional Patent Application No. 63/046,442 filed on Jun. 30, 2020, and entitled "Classification Engine Instance Informing Parsing of Emails Received by an Email Client Instance Executed by a Mobile Device" the contents of which is incorporated by reference in its entirety.

TECHNICAL FIELD

Embodiments described herein relate to electronic mail received by mobile devices and, in particular, to systems and methods for locally classifying email messages received by an email client and, for each determined one or more classifications of a received or selected email message, extracting information, attachments or data based on the classification, and organizing/displaying that information based on a second classification thereof.

BACKGROUND

Electronic mail ("email") is leveraged for a wide variety of personal and professional purposes. Some emails provoke a recipient to perform some action, such as saving an attachment, replying in a particular manner, scheduling or performing a non-email task, and so on. Other emails contain content for a recipient to read or review, such as a newsletter. Still other emails contain status updates, receipts, or other generalized information generated by software services platforms. In many cases, however, recipients of emails frequently receive a number of emails per day. A recipient of email is required to develop his or her own methods and schedules to sort, filter, and/or otherwise triage email messages and to manually determine which messages or content should be consumed and/or acted upon first, often resulting in inefficiencies and, in some cases, resulting in delayed responses to time-sensitive information or content inadvertently overlooked by the recipient.

Conventional email client applications can include rules engines that can assist email recipients with certain application-level organizational tasks (e.g., sorting messages, generating calendar events and reminders, and so on), but such applications are often unable to assist users, without substantial manual configuration and testing, with completing higher-order repetitive tasks, such as replying to emails with message-specific content, selecting appropriate recipients of a reply, opening an application or web address in response to receiving an email, and so on. In addition, conventional email message client applications are often unable to assist users with higher-order tasks triggered by electronic messages due to sandboxing requirements and/or other system-level application programming interface or permissions limitations.

Further still, conventional emails often include one or more embedded tracking scripts that collect and distribute metrics about the recipient to third parties, such as marketing firms. Such metrics include click-through rates, message view counts, dwell times, and so on. Such information, when paired with unique identifiers linking to the recipient's email address exfiltrate substantial information describing the recipient of the email, often without the recipient's permission or knowledge.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
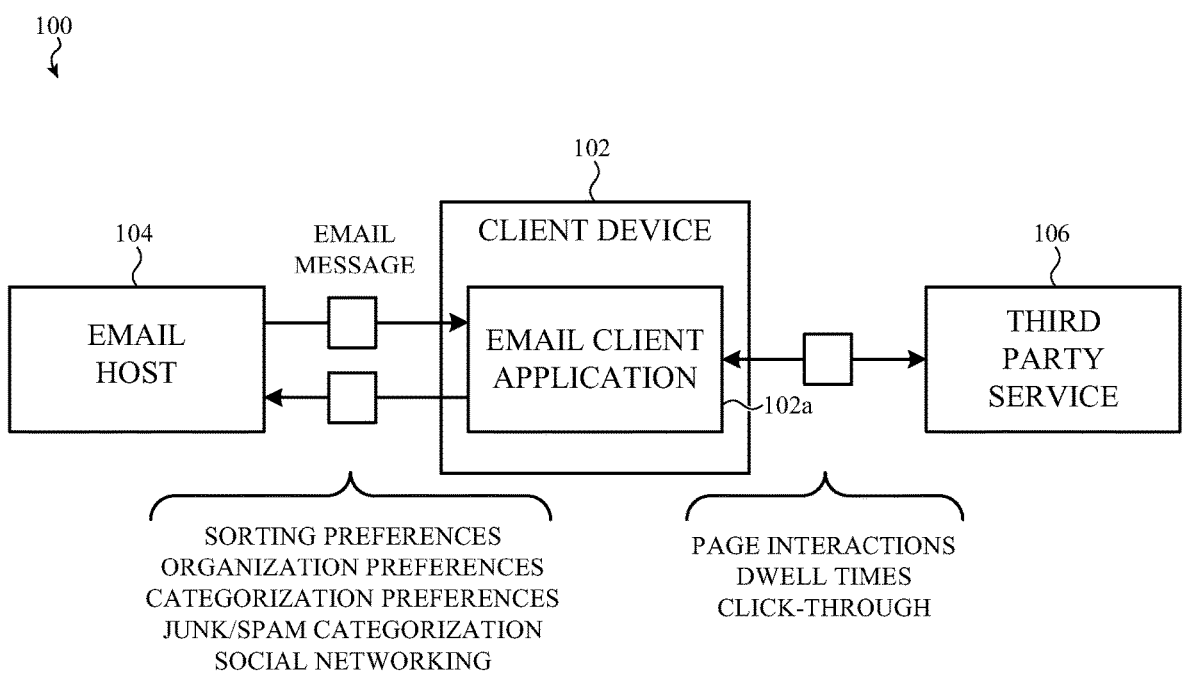
FIG. 1A depicts a system configured to send and receive email.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for increasing efficiency with which information is exchanged between a sender and a recipient of electronic mail via an electronic mail messaging protocol.

In particular, embodiments described herein reference systems and methods for (1) improving functionality of a mobile computing device (e.g., mobile phone or tablet) executing an instance of an email client application configured to send and receive email messages, (2) for improving the functionality of internetworked computing networks across which email messages are exchanged, (3) for enhancing privacy for recipients of email by reducing unintended/or automatic disclosure by conventional email client applications of personally identifying information and or marketing information and, (4) for improving efficiency of displaying, digesting, and acting upon information contained in, or referenced by, an email message directed to a particular recipient.

In a more simple and non-limiting phrasing, embodiments described herein reference systems and techniques for dramatically improving usefulness of existing email communications protocols for both senders and recipients of email, as well as manufacturers of electronic devices configured to send and receive email messages, as well as entities managing communications networks leveraged, at least in part, to exchange email messages.

More specific to the foregoing, embodiments described herein can be operated to: (1) reduce bandwidth utilization by reducing a need for outbound network requests (e.g., to load remote resources) initiated by conventional email client applications; (2) increase email recipient privacy by blocking or otherwise prevenient rendering of HTML-formatted (and other) emails containing tracking scripts without preventing a recipient from consuming/receiving useful information from such emails; (3) increase email recipient privacy by reducing and/or eliminating a need to leverage email host services to organize email, categorize email, delete email, and so on; and (4) reduce processing overhead (specifically, at client devices configured to receive email messages) associated with querying an email database stored in device memory, obtaining an email message from the device memory, accessing or instantiating an appropriate rendering engine to display that email, rendering the email with the engine, and so on.

In each of these foregoing configurations, network utilization is decreased, processor/memory resource utilization is decreased, user privacy is enhanced, and power utilization efficiency of the client is improved at least in part because the recipient of email can consume and act upon information sent via email in a substantially more time efficient manner, thereby reducing the time the user spends using the client device to accomplish equivalent email management work.

In particular, embodiments described herein reference systems and methods for operating a client device to pre-process incoming emails, identify and extract only information or data from those emails that are relevant to the recipient of the email, validate and/or otherwise enrich extracted data, and present the extracted data in a datatype specific graphical user interface or, in many configurations, a datatype specific portion, region, section, tab or other subdivision of a single user interface.

For example, in some embodiments, a recipient of email may receive a first email from an ecommerce service that is a receipt for an online purchase, a second email that is a personal email introducing the recipient to a social or professional connection of the sender, a third email that is an advertisement, a fourth email that originates from a software as a service (SaaS) platform and informs the recipient that some new data or information has been added to the SaaS platform, and a fifth message that contains a newsletter relevant to the recipient.

Conventional Email Communications Systems

In a conventional email communication system, all five messages of the foregoing example are rendered in a single message view and presented in many cases in the order in which they are received. To view or to consume information contained in or referenced by these messages, a user of conventional email is required to manually open each message, wait for a period of time for the message to render and/or load remote resources, and so on. Each of these steps can consume time and can cause the recipient to switch context so frequently that the recipient may defer reviewing further emails until a later time.

For example, in conventional email communications system systems, privacy issues may exist. For example, in reference to the first example email message, the ecommerce service email may include not only purchase information, but may also include one or more HTML message portions that cause the recipient's client device to load one or more remote resources. Servers hosting these remote resources can log the recipient's IP address, associate that IP address with an approximate geographic location (e.g., via reverse geocoding), and/or can associate that IP address and location with the recipients address. In further examples, this ecommerce email may also include one or more tracking scripts configured to monitor user interactions with the email, such as click-through, dwell times, and so on. These foregoing examples are not exhaustive; it may be readily appreciated by a person of skill in the art that an email message, such as the example ecommerce email, can be used to obtain a substantial quantity of private and personally-identifying information describing a recipient of that email. Recipients of email often are unaware that such information can be gleaned from a seemingly simple task of opening an email to view its content.

It may be further appreciated that such personal information may be collected from the recipient without the recipient's permission in large part because recipients of email are not presented with an option to refuse email messages; any message directed to the recipient will be received by the recipient, presuming an intervening spam filter does not block the message in its entirety. For example, continuing the example above, the third email message containing an advertisement may also include one or more tracking scripts or one or more remotely-loaded resources. As with the ecommerce mail message, the advertising message may be used to collect information from a recipient of that message simply by virtue of the fact that the message was sent in the first place; the recipient is not empowered to control whether such data is collected or not.

Further still, in other conventional architectures, such as with the fourth example email message (SaaS platform message), the recipient may be required to click through a link within the email message and/or to launch a separate application in order to view information referenced by the email message, further extending the time required of the recipient to consume all information contained in each of the five example messages. For example, the fourth SaaS message may include a body with the content "John Smith has commented on your post." The body content may also include a deeplink that may be clicked by the recipient to view the referenced comment and to view the referenced post. As may be appreciated by a person of skill in the art, this workflow is time consuming and involves substantial context switching in order to consume relevant data from each message. In such cases, the recipient can unintentionally overlook a personal message, such as the second message intending to introduce the recipient to a personal or professional contact. In other cases, the recipient may spend so much personal time filter messages and triaging information that the recipient may not be able to read newsletters or perform other time-consuming message digest actions. As such, personal or professional messages and newsletter messages may go unread.

In view of these foregoing examples, it may be appreciated that certain conventional emails may present a privacy risk (e.g., via tracking scripts or remote resource loading), may require or trigger extra actions or steps by the recipient (e.g., messaging referencing information stored elsewhere, such as SaaS notifications), and/or may require a minimum time to digest and/or to respond to (e.g., newsletters, personal messages, and so on).

In further cases, as may be appreciated by a person of skill in the art, many email messages contain a number of in-line media and/or graphics, or are otherwise large-size messages. Especially in the context of remote resource loading, it may be appreciated that many messages require substantial bandwidth to fully download, require substantial processing and local memory overhead to render and display, and require substantial local memory to persistently store.

These foregoing described issues may be particularly problematic for corporations managing or hosting accounts of hundreds or thousands of employees. As one example, loading a 500 kb remote resource (e.g., a graphic) hundreds, or thousands, of times occupies a substantial share of bandwidth, storage, and processing resources of an organization. As email messages continue along the trajectory of including more rich content (e.g., more remote resources, more inline media, and so on), it may be predicted by a person of skill in the art that average message size may continue to grow.

Preprocessing Email Messages by Single or Multi-Stage Classification

In contrast to the forgoing described example conventional email communications systems, a system described herein is configured to preprocess messages to extract only relevant content therefrom and to present that content in a portion of a graphical user interface dedicated to that content's type.

Continuing the preceding example, a client application as described herein may perform a preprocessing operation to extract from the first message (ecommerce receipt) a purchase amount, a tracking number, and an item name. The purchase amount can be displayed in a dashboard view that tracks emails containing financial information, the tracking number can be added to a calendar view that shows for the user what deliveries are expected on what days, the item name can be added to a "recently purchased" list, and so on. As a result of this preprocessing operation, multiple useful items of information can be extracted from a single message and can be categorized with like information (e.g., tracking information, financial information, shopping information and so on). In this construction, a copy of the full message is not required to be stored locally; only data extracted from the email message can be stored locally. Similarly, because the ecommerce message itself is not rendered for the user, no tracking scripts and no remote resources are loaded, thereby improving privacy.

For the second email (networking introduction), the preprocessing operation may be leveraged to extract a name and/or contact card for the connection, suggest a calendar date to facilitate the introduction, and may add that card automatically to a contact list. As a result of this preprocessing operation, one or more actions that may have been required to be performed by the user in response to receiving the message can be performed automatically.

For the third email (advertisement), a coupon code and an expiration date thereof can be extracted and added to a coupon clipping section of the graphical user interface. The coupon code can be associated with the date so that the coupon is automatically deleted or hidden if it is no longer able to be used by the recipient. As with preceding examples, in this construction, a copy of the full message is not required to be stored locally; only data extracted from the email message can be stored locally. In addition, because the advertisement message itself is not rendered for the user, no tracking scripts and no remote resources are loaded, thereby improving privacy.

For the fourth message (SaaS message), the preprocessing operation can extract an identifier used by the SaaS platform and can generate a device-level notification to the user informing the user of the SaaS platform update. The client application and/or another process or module (e.g., a plugin or framework) can leverage the identifier to access the SaaS platform directly to pull a copy of the information referenced in the email so that the user/recipient is not required to context switch into the SaaS platform. As with preceding examples, in this construction, a copy of the full message is not required to be stored locally because only the identifier is required to perform further actions; only data extracted from the email message can be stored locally, if at all.

For the fifth email (newsletter), article content can be extracted and can be added to a reader view. In some cases, formatting and/or inline resources can be stripped such that as with preceding examples, a copy of the full message is not required to be stored locally; only data extracted from the email message can be stored locally, if at all.

For some implementations of the preceding example, none of the five email messages received by the recipient may be rendered in a graphical user interface. In another non-limiting phrasing, the received email messages may be intentionally suppressed from view of the recipient, instead only displaying information relevant to the recipient in dedicated portions of the graphical user interface.

As a result of this architecture, if the user desires to look for coupon codes in order to make further online purchases, the user can access the coupon clipping section of the graphical user interface, which may automatically update based on expiration date of each respective coupon or sale detail extracted.

In another example, of the user desires to find purchase information regarding a recent purchase, the user is only required to access the recent purchases section of the graphical user interface. In another example, if the user desires to check in on spending over a particular period, the user can access the dashboard view that tracks financial information.

In yet another example, if the user desires to catch up on news or other article reading, the user can access the reader view to read only the content relevant to the recipient at that time.

It view of the foregoing examples, it may be understood that generally and broadly, a system as described herein can be leveraged to process or otherwise handle content of email messages in a manner reflective of that content's type, regardless (in many cases) of the source or format of the email originally containing that content.

In this manner, without limitation: information intended to be consumed by reading can be extracted and redirected to a reader view; information that serves as a notification can be used to generate a temporary notification presented to the user; information that serves as an emergency message can be elevated in importance (e.g., initiates a phone call to the user, displayed prominently in a graphical user interface, leverages another messaging protocol to connect with a user in a different manner, and so on); information that serves as an ecommerce incentive (e.g., advertisements, sales receipts, and so on) can be aggregated in a separate view dedicated to ecommerce coupons; information that contains a personal message can be used to trigger one or more reminders, actions, or follow-up emails; and so on. Each of these foregoing described example functions In these implementations, embodiments include an email client application executing on a client device that is communicably coupled to an email host service. In this communication topology, the email host service implements one or more email protocols (e.g., IMAP, ActiveSync, Exchange Server, and so on) that can be leveraged by the email client application to interact with the email host service to obtain copies of new email messages and to request copies of previously-received email messages. For example, the email client application may request new email messages from the email host service, may move or delete messages, may create or delete folders or subfolders containing messages, and so on.

For simplicity of description and brevity, the term "email" can be used herein to refer to any email message, regardless of form or format. An email is typically a file formatted according to, and/or otherwise compliant with, one or more protocols and is sent via the open Internet from a sender to a recipient. More specifically, an email, such as described herein originates at a sender server, also referred to herein as a "third-party server" that communicably couples with an "email host" server associated with an email provider, of which the recipient of the email is a subscriber. At a later time, a client device operated by the recipient (herein, "end user" or "recipient") communicably couples to the email host and receives a copy of the email sent from the sender, which may also include metadata information such as message-identifying information and/or server identifying information. Such information, along with other email metadata included in the email received at the client device is referred to as "header" information.

More specifically, the client device operated by a recipient may include a processor and a memory. The processor can be configured to execute program code and/or instructions stored in the memory to instantiate an instance of an email client application that, in turn, is configured to communicably couple to, and exchange information with, at least one email host server to obtain copies of emails transmitted to the email host server by one or more third-party email host servers. In these examples, an email client application (more simply an "email client application") can receive and/or otherwise process email messages stored on the email host server. Once a "new" message is received by the email client application from an email host server, it may be referred to as a "received email message."

For embodiments described herein, the email client application includes, is communicably coupled to, and/or is otherwise configured to leverage one or more trained classifiers in order to assign a class, type, or other identity or grouping to email messages hosted by the email host service. In these embodiments, as described in greater detail below, the trained classifier can be configured to receive an email message as input and to provide as output a classification of that email message selected from a set of classifications.

Once a classification of the email has been determined, that classification can be used to inform and/or select a parser that, in turn, can extract particular information, content, data, or metadata from the email message. Thereafter, each individual data item can be, in turn, validated, typecast, and/or separately classified in another operation (e.g., by using the same trained classifier, a separate trained classifier, and/or any other suitable process, module, or functional block).

In some examples, the extracted information can be used to obtain other information which, in turn, can be validated or processed in a manner such as described above. By leveraging these foregoing operations, specific actionable or useful information can be derived (either directly or indirectly) from an email message.

Once such information is obtained, regardless of form or format, embodiments described herein can further display or cause to be displayed that information in a graphical user interface, organized in a manner selected based on the classification of the information extracted. In this manner, useful information from email messages can be extracted and displayed alongside useful information of the same time, thereby dramatically simplifying processes of consuming information contained in email messages.

The foregoing and following described embodiments can have many impactful implementations, some examples of which are discussed below. In particular, as noted above, the systems and methods described herein (1) improve functionality of mobile computing devices (by reducing quantity of data to be rendered, queried, and stored locally), (2) improve the functionality of computing networks across which email messages are exchanged (by reducing quantity of remote resource requests), (3) enhance recipient/recipient privacy (by preventing tracking scripts and remote resource loading) and, (4) improve efficiency of consuming information contained in, or referenced by, email messages (by presenting, graphically, information of like type together).

More specifically, these systems and methods improve the functionality of computing devices—especially mobile computing devices—by leveraging a multi-stage classification technique as described above. In another non-limiting phrasing, by filtering out irrelevant content/data from email message bodies, headers, and attachments, only a small quantity of data is needed to be stored locally by a client device executing the client email application. It may be appreciated that this relatively small quantity of data is more efficient to load into working memory and to display in a graphical user interface than conventional full-scale email messages. As a result, as may be appreciated, the email client application can execute more rapidly and efficiently.

Preprocessing of email messages, as described above, can be performed in a number of ways. For example, in some cases, a set of trained classifiers may be leveraged by the email client application. Each of the set of classifiers may be associated with and/or specifically trained to recognized email messages of a particular classification. For example, a first classifier may be particularly configured to identify ecommerce messages, a second classifier may be particularly configured to identify SaaS messages, a third classifier may be particularly configured to identify advertisements, and so on.

In such embodiments, a received email message can be provided as input to each of a set of classifiers. Each classifier may be configured to output a statistical confidence corresponding to a likelihood of whether the input email message is correctly identified as the particular class associated with that classifier. For example, an incoming email message may include a subject line of "Your Receipt for Yesterday's Purchase" may be provided as input to an ecommerce classifier, a newsletter classifier, and a SaaS notification classifier. In this example, the ecommerce classifier may return a statistical confidence of 90%, the newsletter classifier may return a statistical confidence of 15%, and the SaaS notification classifier may return a statistical confidence of 70%. From these classifiers' output, the email client application may select the highest statistical confidence and/or a set of the highest statistical confidences. In other words, for this example, the email client application can classify the receive message as a likely ecommerce message and a likely SaaS message.

Thereafter, a parser or a set of parsers may be selected based at least in part on the classification(s) of the received email message. For example, a first parser may be configured to extract text information from images (e.g., via optical character recognition), a second parser may include one or more regular expression engines and corresponding regular expressions to extract specific substrings from strings of text, a third parser may be configured to obtain metadata from an inline image or media item or attachment, a fourth parser may be configured to access header information from the message, and so on.

These foregoing examples are not exhaustive, it may be appreciated that these are merely examples; any number of suitably configured parsers may be included for embodiments described herein. In addition, in some embodiments different client applications and/or differently configured client applications may include different parsers; certain parsers may be optional, certain parsers may be custom, certain parsers may be user defined, certain parsers may be defined by an email message itself (e.g., embedded in an email message, such as described below), and so on.

Independent of a particular configuration of a particular implementation, it may be appreciated that one or more parsers may be selected based on one or more classifications of a particular message as determined by one or more classifiers, such as described above. For example, an ecommerce classification may be associated with a financial information parser configured to extract price information from a body of text whereas an invoice classification may be associated with a financial information parser configured to perform an OCR operation against a PDF attachment in order to extract line items of a particular invoice. In yet other examples, a SaaS classification may be associated with a parser configured to access one or more remote databases or remote APIs in order to obtain information directly from a particular given SaaS tool.

Once a set of parsers are identified based on one or more classifications, the received email (or a portion thereof) may be provided as input to the selected parsers which, in turn, can provide output. In some examples, a parser may be configured to provide output in text/string format. In other cases, a parser may be configured to provide an output in a date format or a numerical format. In yet other examples, a parser can be configured to provide a serialized object (JSON, XML, and so on) as output. In yet other examples, a parser can be configured to provide a database query language-formatted string configured to access data from a database as output. These foregoing examples are not exhaustive; it may be appreciated that any suitable parser may be configured in any suitable manner to provide output in any suitable form or format.

In many embodiments, collective (or, optionally, individual items thereof) data output from one or more parsers can thereafter be classified as a set one again. For example, if an email message is classified as an ecommerce message, a price parser, a product name parser, and a merchant parser may be selected. The price parser can be configured to receive the body of the email as input, and can be configured to output a price, charge, or total that is contained in the email body. The product name parser can be configured to determine a product name or a service name from the email body and/or the email subject line. The merchant parser can be configured to receive as input the sender address and, based on a domain name associated with that address, determine a merchant. These three data items can thereafter be grouped and provided as input to a secondary classification system. The secondary classification system determine that because a price was detected, and a product was identified, and a known online merchant was identified that the email message is a receipt for a purchase of an online product or service.

In another example, the price parser may fail to return a price and the product parser may return multiple identified products. In this example, the secondary classification system can determine that because a price was not detected, and multiple products were identified, that the email message is an advertisement for a purchase of an online product or service.

In another example, each of the price parser and the product parser can fail. In this example, the secondary classification system can determine that the original classification is potentially wrong (and should be performed again or alternatively a different classification should be selected), or alternatively, the secondary classification system can determine that the ecommerce message does not contain any useful information. In such cases, the secondary classification system can determine that the email message is a general notification from the merchant (e.g. a policy change, a status update message, and so on).

In yet another example, an email message can be classified as a SaaS message. Based on this classification, a set of parsers can be selected, one of which is configured to detect a specific identifier specific to a particular SaaS product. Once the parser identifies an identifier that matches the form or format specific to the SaaS product, the parser can be configured to submit an API request to that SaaS product in order to query for more detailed information. For example, a SaaS product may be a collaboration tool such as a shared documentation service. In this example, the collaboration tool can be configured to send email alerts when a particular page is edited. Such email messages may merely state in a body thereof that "Page XYX was edited by ABC." In this example, the above-identified parser can be configured to extract the page identifier XYZ and, therewith, to access the collaboration tool to determine what edits were actually made. In this example, the parser can be configured to provide as output the result of its query made to the SaaS platform.

As noted above, once one or more parsers return one or more values extracted from an email message and the set of outputs from the parsers is classified as a set, data from the parsers can be displayed and/or added to a graphical user interface, such as described above. In particular, data output from the parsers can be displayed alongside similar data; financial data can be displayed with financial data, shopping data can be displayed with shopping data, coupon information can be displayed alongside coupon information, SaaS alerts can be displayed alongside (and/or aggregated with) other SaaS alerts and so on. Many configurations are possible.

These foregoing example are not exhaustive of the various configurations of a system as described herein. However, it may be readily apparent to a person of skill in the art that the multi-stage categorization and parsing as described herein can be efficiently leveraged by mobile devices in a number of ways. For example, one or more parsers that may be relevant to a first user may never be relevant to a second user because the first user and the second user receive emails from different merchants or different SaaS platforms. In such cases, a client application of the first user may be configured differently than a client application of the second user. In particular, for some embodiments described herein, one or more parsers can be hosted at a remote server, and can be made available for download to a particular client device on demand. As a result of this construction and configuration, a set of client applications can self-configure in the field to classify and/or parse email messages only according to the emails received by that particular user.

In an alternate, non-limiting phrasing, due in part to the herein described architecture of multi-stage classification and purpose configured parsers and classifiers, a client device need not include a monolithic classification engine configured to classify and extract information from an arbitrarily large number of differently-formatted emails. Instead, a pseudo "microservice" architecture can be defined in which purpose-configured classifiers and purpose-configured parsers can be selected (either automatically or manually) so as to classify and extract data from emails that a particular user typically receives.

For example, a first user may conduct online commerce with primarily two merchants, merchant A and merchant B. A second user may conduct online commerce with different merchants, merchant C and merchant D. The first user has no use to configure his or her client application to classify and extract information from emails received from merchant C or D, just as the second user has no use to configure his or her client application to classify and extract information from email received from merchant A or merchant B. As a result of providing discrete and purpose-configured classifiers and parsers, each of the first user and the second user's client applications can leverage only those classifiers and parsers that are needed. Should additional classifiers and/or parsers be needed, executables and/or plugins can be downloaded from a remote server or service on demand.

Persons of skill in the art will also readily appreciate that higher-order advantages and benefits can be leveraged from a system as described herein. In particular, as noted above, different parsers and different classifiers may be used in different installations. In some constructions, end-users may be provided with an API or other foundational framework in order to develop purpose configured parsers or purpose configured classifiers. In many embodiments, community-developed parsers and/or classifiers can be distributed from user to user in a centralized, federated, or peer-to-peer manner. For example, a first user of an email client application as described herein may be motivated to develop a parser to extract a particular field from a particular message identified by a given classifier. In this example, once the first user develops the parser, the second user's client application can access and instantiate the parser to gain the functionality developed by the first user.

In view of the foregoing described examples, which may be appreciated are not exhaustive of the various configurations and uses of a system as described herein, a person of skill in the art may readily appreciate that email messages sent from arbitrary sources with arbitrary content can be classified using an appropriate classifier, parsed using one or more appropriate parsers, and classified again based on the data extracted from those messages. As a result of this data processing pipeline, recipient-relevant information can be readily extracted from email messages received and all other content from those messages can be discarded or otherwise not saved on or at a client device. Further, it may be appreciated that the modular architecture described can be leveraged to automatically field configure a user's client application specifically to the emails typically received by that user. Once configured, data extracted from emails received by the recipient can be shown in dedicated user interfaces and/or datatype specific sections of a single user interface so that like information can be consumed by the user together.

These foregoing examples dramatically improve the efficiency of operating a client application at a client device, in particular, a mobile device. By extension, as noted above, network bandwidth utilization can be reduced, privacy can be increased, and local storage and processing requirements can be reduced. These foregoing described embodiments are not exhaustive of all configurations or functions of an email client application as described herein.

Embedding Payloads into Sent Email Messages

In particular, in other embodiments, emails received by a client device may be transmitted with embedded information that informs a recipient's client device how to process, categorize, or otherwise handle that email. In such examples, leveraging one or more classification engines or parsers, such as described above, may not be required thereby further increasing computational resource utilization efficiency and bandwidth utilization efficiency.

For example, some embodiments described herein relate to systems and methods for embedding information and/or instructions into an email message, the embedded information and/or instructions encoded according to a predetermined protocol. In these embodiments, a recipient electronic device can execute a email client application, configured as described herein, that extracts the embedded information and/or instructions (also referred to herein as a "payload") and can cause the client device to perform one or more system-level and application-level functions (in sequence or in parallel, substantially simultaneously), automatically, and according to one or more instructions defined in the payload.

As a result of these constructions, a sender of an email message can inform and/or otherwise dictate (1) how that email message is consumed by a recipient, (2) how that email message is consumed and/or processed by a recipient's electronic device, and/or (3) what function or functions a recipient electronic device can or should perform in response to receiving a message from that sender.

Example ways by which the manner a recipient consumes an email message received by an email client application, such as described herein, can include, but are not limited to: suppressing display of an email message from an email message list (also referred to as an inbox); displaying an email message in a different manner than other email messages; displaying content of an email message in a different user interface location, separate from the user's inbox (e.g., a tab or location dedicated to different message types, such as social media messages, software service notifications, shopping messages, and the like); and the like.

Example functions that can be performed by an email client application in response to receiving an email message including a payload such as described herein include, but are not limited to: suppressing display of an email message from an inbox and, instead, generating a native application notification formatted according to a payload extracted from the mail message; suppressing display of an email message from an inbox and, instead, generating a native application notification with content defined by, or extracted from, a payload extracted from the mail message; displaying a received email message according to, or otherwise informed by, a format definition extracted from a payload extracted from the email message; displaying an already-received email message or a set of already-received email messages, according to, or otherwise informed by, a format definition extracted from a payload extracted from a newly-received email message; and the like.

Example functions that can be performed by a recipient client device, such as described herein, in response to an email client application executed by that end user client device receiving an email message including a payload such as described herein include, but are not limited to: accessing a sensor (e.g., a gyroscope, an accelerometer, a global positioning system sensor, a battery level sensor, a camera or image sensor, a light sensor, an acoustic sensor, or an environmental sensor such as a temperature sensor, humidity sensor, hygrometer, barometer, air quality sensor, and so on) of the client device and obtaining a state or status of the sensor; performing an action with a haptic output element of the client device; performing a disk-level action (e.g., add a file, delete a file, move a file, and so on) outside of the context or sandbox of the email client application; and so on.

In further examples, multiple functions can be performed by the recipient client device in a workflow, program, or other order or sequence to confer additional benefits to the recipient beyond the convenience of simply receiving and consuming an email message by classification and extraction of information, such as described above.

For example, a recipient client device can determine its location in response to receiving an email (e.g., via a Bluetooth component, a Wi-Fi component, a global position system sensor, and so on). In these examples, the device's location can be used to inform how one or more email messages are displayed, how the end user is notified that a new email message has been received, or any other suitable action.

For example, in these embodiments, if an end user receives a high priority email message when that user is physically within a machine shop (where that user is unlikely to hear an acoustic notification or to feel a haptic notification), the recipient electronic device can be instructed by the email message itself to send a signal to an industrial control system in the machine shop to flash the lights of the machine shop, to flash a warning light, or initiate an announcement via an intercom system.

Continuing the example, if the same recipient receives the same message while the recipient is not in the machine shop, the message may be delivered and the user may be notified in a conventional manner. A person of skill in the art may readily appreciate that by leveraging the methods and systems described herein, safety and promptness of drawing a recipients attention to a message can be dramatically improved.

In yet another example, a recipient device can be configured to leverage more than location data. For example, the device may be configured to automatically connect to a conference room's multimedia system upon receiving an invitation to a meeting in that conference room when the device is physically present within that conference room. In another example, and recipient device can be configured to determine whether the recipient is currently driving a vehicle and/or is using navigation software; for example, to determine whether the user is on his or her way to a meeting.

In this example, a meeting cancellation message sent to the user may inform the recipient electronic device to interrupt navigation and to inform the user that the meeting to which the user is driving has been canceled and/or relocated to a different location. In the second case, the recipient device can be configured to automatically adjust the destination address based on content of the message received.

In yet other examples, one or more functions of a recipient electronic device can be delayed or enqueued until a sensor of the recipient electronic device transitions to a particular desired state. For example, an email message related to a task the recipient of that message has to perform in a particular location (e.g., a trouble ticket to fix a particular piece of office equipment) can be sorted to the top of a message list when the end user is nearby that particular location.

In one specific example, an information technology specialist may receive a number of messages on a daily basis each related to or associated with trouble tickets that require the user's physical presence in different locations. In these examples, each message can encode location information or geo-fence information such that when the specialist is on the $13^{th}$ floor of a particular office building, messages (or trouble tickets) related to that floor—regardless of when such messages were sent or received—can be sorted to the top of the specialist's message list so that when the specialist checks his or her email messages, location-relevant messages are prominently displayed.

In a further example, a retail store may send an email message to a customer. If the customer receives the message while the customer is physically within a retail location of the retail store, a coupon may be issued to the customer by the retail store. In another example, the retail location may issue a coupon to the customer if the customer visits the retail store within a time period of receiving the message (e.g., if the customer visits a retail location of the retail store within three days of receiving the message, a coupon can be issued to the customer).

In yet other examples, other sensors or systems of an electronic device that receives an email message can be used. For example, internet requests for information can be initiated in response to receiving an email. As one example, if a recipient receives a message that is a receipt for a purchase, an request can be initiated to the credit card issuer such that the user's credit card balance may be shown.

The foregoing examples are not exhaustive; other systems or combinations of requests can be triggered and/or otherwise leveraged in response to receiving an email message, such as described herein.

Accordingly, generally and broadly, an email client application of a client device can be configured to receive email messages from an email host and, in response to a received email message from the email host server, one or more processing services, functions, modules, or modes of operation of the email client application can be triggered. In particular, one or more processes or services can be configured to determine whether the received email message includes embedded information or, in another non-limiting phrasing, whether the received email message includes a payload such as described herein.

In many embodiments, a payload such as described herein can be inserted into a body of the received email message and can be tagged or otherwise enclosed within custom tags, delimiters, or markup to signal to the email client application where the string value begins and where the string value ends. In some cases, the tags can be configured to be hidden from view if the email message is rendered in a conventional email client application. In other cases, an email message may only contain a payload; no body content intended to be consumed by the recipient may be included.

For example, in one embodiment, the received email message can have content HTML formatted content. In this example, a payload such as described herein can be enclosed in tags/markup that is compliant with the HTML protocol. For example, the payload can be enclosed between "<script>" and "</script>" tags. In other cases, the payload can be enclosed between entirely custom tags, such as "<custom-payload-tag>" and "</custom-payload-tag>."

These are merely examples, a person of skill in the art may appreciated that a string payload, such as described herein can be suitably identified and/or otherwise extracted from a body portion of an email in a number of suitable ways. Additional examples include, but are not limited to: a payload embedded between comment tags; a payload embedded in a script link; a payload embedded in a Cascading Style Sheet ("CSS") or link thereto; a payload embedded as an email header; a payload embedded as a data item within an existing or custom tag; and so on. For simplicity of description, the embodiments that follow reference a payload embedded between custom tags in an (at least partially) HTML-formatted email message body.

In many examples, a string value corresponding to a payload such as described herein conforms to a computer-readable and/or computer-parseable format, such as JavaScript Object Notation ("JSON) or Extensible Markup Language ("XML"). In other cases, the payload can be submitted as an attachment to an email message or embedded in an attachment to an email message. These examples are not exhaustive, however, and it may be appreciated that in other examples other computer-readable formats may be considered and/or may be appropriate. For simplicity of description, the embodiments that follow reference a JSON-formatted string value that corresponds to a payload, such as described herein.

In view of the foregoing definitions and examples, it may be appreciated that a sender of an email message can generate a payload (with one or more instruction and/or "action items"), format that payload as a JSON string, enclose that string between custom HTML tags, insert the enclosed embedded string into a body of an email. Thereafter, the sender to operate the third-party server to send the email to the email host server.

Thereafter, the email host server can, optionally, notify the client device that a new email message is received and is ready for processing. At a later time (e.g., after receiving a notification from the email host server or), the email client application, executed by the client device, can receive the email message from the email host server and can extract the string value corresponding to the payload from the received email message by searching through the email body for the custom HTML tags. Thereafter, optionally, the email client application can parse or otherwise convert the string value into a data object.

Once the email client application has extracted the payload (and, optionally, converted a string value into a data object, or a set of data objects), the email client application can execute one or more instructions (also referred to herein as "action items") defined by the payload or, additionally or alternatively, the email client application can trigger one or more operations or tasks in response to content of the payload. In this manner, the payload defines one or more behaviors of the email client application.

For example, in one embodiment, an email can include a payload that includes an action item that causes the email client application to hide the email from a recipient's inbox. In this example, the payload can include a second action item that causes the email client application to generate a notification for the end user that may be shown immediately or at a specified time. In many cases, content of the notification can be extracted from the payload or another location of email body.

In some examples, a format, style, or multimedia content of the notification (e.g., such as an image shown along with the notification, such as a corporate logo), can be defined by the payload. As a result of the constructions of this example, a sender of the email can define a recipient experience that is substantially different from a traditional email message.

Namely, when the recipient receives a standard email message, conventionally that message appears in an inbox of the client application alongside all other messages from other senders. In this example, the received email message is hidden from the end user and, instead, a notification is shown. In this manner, the recipient's inbox is uncluttered by the email message, but the user still receives important information that the sender desires to communicate.

In one specific example, the sender of an email message may be SaaS platform, such as a project tracking tool (also referred to as a "collaboration tool"). In these examples, as may be known by a person of skill in the art, the collaboration tool can be configured to generate email messages to notify users of the collaboration tool of information related to a project tracked by the tool.

In conventional examples, as noted above, a conventional collaboration tool may generate and send dozens if not more messages per day directed to the same recipient. This quantity of email messages in an user's inbox may reduce the usefulness of the user's email by a substantial amount. Some further conventional email clients may be configured to allow for actions to be performed by a user from the email message itself (e.g., Gmail One-Click Actions, or Microsoft Outlook Voting or Meeting Responses), however, these conventional solutions either (1) only perform a single web request (e.g., Gmail One-Click Actions) that may cause a client device to switch applications or for an end user to switch focus to a new pop-up window or (2) only perform an action that triggers an email to be sent from the recipient's account. In many cases, a user may not prefer to have unsolicited email sent on the user's behalf (e.g., Outlook) and/or the user may not prefer to have focus diverted in order to take action upon a task identified in an email message (e.g., Gmail).

As such, continuing the example above, for embodiments described herein a collaboration tool can be configured to embed a payload with multiple action items such as described herein to simplify how the recipient consumes email messages from that collaboration tool. More specifically, a collaboration tool can be configured to, without limitation, embed a payload to: hide all messages generated by the collaboration tool, instead causing the email client application to render a popup at a particular time of day summarizing emails from the collaboration tool during a selected time period; hide all messages from the collaboration tool from the user's inbox, instead generating a native application-level notification that displays an icon associated with the collaboration tool; reformatting at least a portion of the received email message into a specified file format (e.g., PDF, Microsoft Word, Adobe Photoshop, and so on) and causing the client application to download or otherwise received the reformatted file; accessing a third-party web service specified in the payload to obtain information or data (e.g., social media information, remote CSS, remote HTML, remote Javascript, and so on); marking the email message as "read" and permitting the message to be shown in the inbox; tagging or categorizing the message based on the payload; accessing a client-level service or sensor of the client device (e.g., global positioning sensor, touch input sensor, camera, accelerometer, and so on) and sending data from that client-level service to a specified location (e.g., web address or web-based API or back to the collaboration tool); sorting the email message into a particular folder or group of like messages based on the payload (e.g., messages with content requiring the user to read, such as a news article or a comment added to the collaboration tool sorted differently than messages with content soliciting action, such as a voting or survey request); and so on.

In many cases, the client application can be configured to perform multiple action items that can be performed in any suitable order defined by the payload. For example, a payload can cause the client application to render a native-application window including a survey question, defined at least in part by the payload. Once the user responds to the survey in the native-application window, a second window can be generated based on the payload that asks a second question or survey of the user. In these examples, it may be appreciated that any number of sequential actions can be performed by a client application such as described herein. Similarly, it may be appreciated that any number of suitable action items can be performed simultaneously.

These and other embodiments described herein architect a system in which a sender of an email message can define actions to be taken by a client device or an email client application receiving that message. In other cases, however, a payload such as described herein can be configured to operate with one or more user preferences and/or permissions defined by a preferences file stored on the client device and accessible to the email client application. In these examples, the client application may perform tasks or action items defined by a payload described herein only if such action items are permissible to be performed according to the user's preferences. For example, a user may have a preference that no message is hidden from that user's inbox. In these examples, the email client application may ignore any instruction or action item in a payload that would otherwise cause the email client application to hide the message.

It may be appreciated that the foregoing examples are not exhaustive. It may be appreciated that a payload, such as described herein, can be configured in any suitable way to trigger or otherwise cause any number of suitable tasks or operations to be performed by a client device, such as described herein.

The payload can cause a client device to, without limitation: summarize certain email messages into a single email message delivered at a particular time of day (e.g., set by a user's preferences or by a payload or both); summarize certain email messages into a single notification that is displayed in a customized manner (e.g., with an icon defined by a payload, with emphasis or text formatting defined by the payload, with a size or shape or style defined by the payload and so on) and/or displayed to the user at a particular interval or at a particular time (e.g., set by a user's preferences or by a payload or both); aggressively notify a user that the email message has been received, by accessing one or more client-level notification devices, such as speakers, haptic elements, and/or other service; suppress all indications that a an email message has been received; preventing an email received from being stored; emphasizing or performing an action on another email message after receiving a first email message (e.g., a reminder message or follow-up message); generate a user interface ("UI") element according to a definition in the payload (e.g., button, slider, popup, text entry field, radio button, select button, and so on); associate an action to be performed by the client application in response to a user interaction with a particular UI element; schedule a task to be performed or an action item to be performed if the user does not perform an action within a particular time period; retrieve input from a sensor or other hardware component of the recipient device and send information retrieved therefrom to another component or system; and so on.

It may be appreciated that the foregoing examples are not exhaustive; a person of skill in the art may appreciated that any suitable number of action items, including any suitable action or set of actions can be performed by a system such as described herein. For simplicity of description, the embodiments that follow reference an example sender of an email as a notification service of a collaboration tool. The collaboration tool can leverage the notification service to insert/embed one or more actions into different email messages to an end user. The payload(s) embedded into said messages can inform one or more manners by which the end user consumes information in those messages.

For example, the collaboration tool may send email messages to a user: each time a project assigned to the end user is updated; each time another user comments on something owned, authored, or under the control of the end user; at an interval with statistics describing the function or operation of a project in a given time period (e.g., how many users accessed a site or page on a particular day, how many unit tests are passing or failing, how many team members pushed commits to a particular project in a particular time period, and so on); and the like. In these examples, the collaboration tool can be configured to inject or embed a payload that triggers different behavior on the end user's device depending upon the type or kind of message sent by the notification service.

For example, informational notices sent to the end user (e.g., statistics, notifications, and so on) may be presented in a different manner than actionable notices (e.g., surveys, approval emails, meeting invitations, voting, and so on). For example, information notices that are high priority may be suppressed from the user's inbox but may trigger the email client application to generate a high priority notification (e.g., along with a sound, a haptic alert, and so on). In these cases, informational notices that are low priority may be suppressed from the user's inbox but may trigger the email client application to generate a summary notification or email message once per day (or at another interval such as weekly, hourly, and so on) that summarizes content from all messages of that type received in a time interval.

Similarly, informational notices that have a medium priority may be suppressed from the user's inbox but may trigger the email client application to generate a low-priority notification (e.g., lock screen notification, silent notification, and the like) that the email.

In other examples, the collaboration tool can create a payload that triggers actions based, at least in part, on the recipient's location when that user receives an email message. In a simple phrasing, in some examples, the collaboration tool can instruct the client's device to locate itself (e.g., by leveraging a global positioning sensor, by accessing Wi-Fi connection information, and so on) and, based on the location, determine whether additional action items should be performed.

In a simple example, this construction can enable different behaviors for notifications or other action items based on whether the user is at work, whether the user is at a job site, or whether the user is not within a recognized area. In this manner, a user's work-related notifications or emails may be processed differently depending upon where the user is when the message is received. In another example, the payload can further cause the user's email client application to generate an out of office message in response to receiving a message when the user's client device determines that the user is not within a recognized location.

Similar to location information obtained from a user's client device, other outputs from other sensors can be obtained to inform other behaviors of the email client application and/or the client device. Examples include but are not limited to: providing different notification types depending upon ambient sound levels (e.g., high ambient sound triggers haptic alerts, whereas low ambient sound triggers audio alerts); providing different user interface elements or different user interfaces based on whether the user is driving (e.g., a global positioning sensor reports high speed); providing different user interface elements, different alerts, or different notification schemes based on a time of day or night; increasing or decreasing a reminder priority based on the user's location (e.g., suppress a reminder for a user to visit a file room if a Bluetooth sensor of the user's device reports that the user is within the file room); and so on.

As noted above, the foregoing examples are not exhaustive. To the contrary it will be appreciated that a payload such as described herein can be configured to define or leverage a Turing-complete programming language to trigger or cause to be triggered any suitable action or execution of code by a user's client device or by a user's email client application. In this manner, the embodiments described herein reference a defined format or protocol that can be leveraged by a sender of an email message and a recipient of an email message to convey additional information and/or to perform additional actions.

In this manner, in a more simple and non-limiting phrasing, certain embodiments described herein leverage popular and existing email communications protocols to confer additional functionality to a user that may provide the user with a more pleasant, a more organized, and a more useful email consumption experience.

Triggering Workflows and Actions from Payloads
in Email Messages

In further embodiments, embedded payloads can be leveraged for additional purposes beyond informing a graphical user interface of a recipient's email client. In other examples, embedded payloads can include instructions for the client device to perform one or more tasks independent from rendering the message or content thereof. Herein, information embedded in an email (e.g., within a header, within a body, within a subject field, within an addressee field, and so on) that can be used and/or parsed in order to trigger one or more automatic actions can be referred to as an "actionable serialized object" or more simply a "serialized object" embedded into an email.

A serialized object as described herein refers to a data structure, memory object, or other computer-readable data item that has been converted ("serialized") into a string of bytes suitable to be stored, transmitted, or otherwise communicated between computing resources or shared between instances of software.

A serialized object embedded into an email, as described herein, can be automatically parsed and/or otherwise consumed at a recipient device (also referred to as a client device) to cause that device to perform one or more tasks or operations. This architecture allows for dynamic configuration of one or more behaviors and operations of a first user's client device (e.g., a recipient of an email as described herein) according to preferences of a second user (e.g., a sender of an email as described herein), thereby facilitating richer and more customized device-to-device and/or person-to-person interactions by leveraging established and popular email protocols as a communication backbone and without requiring pre-configuration of either the first or second user's client device.

For example, in one embodiment, a serialized object embedded in an email (e.g., within a header, within a body, within a style sheet, or any other suitable location) sent from a sender to a recipient may be used by the sender to define how that message is displayed on the recipient's device. For example, the sender may prefer to hide the email message from the recipients inbox (so as to not clutter the recipients inbox), instead opting to generate a notification.

This option may be leveraged by a sender when the sender only has a short message to convey that does not warrant (or solicit) a replay, such as "I have arrived." In such examples, the serialized object embedded into the email may include a flag, field, or other data item that indicates the message should only be displayed as a notification.

In this manner, when the recipient's device receives the message, the serialized object can be extracted and the flag, field, or other data item can be parsed to inform an action of the recipient's device. In this example, the action performed in response to parsing the embedded serialized object includes two parts: (1) the message is hidden from the recipient's inbox and (2) a notification is generated including content extracted from the message and/or from the serialized object itself.

In certain continuations of this example, the sender may opt to instruct the recipient's device via the embedded serialized object to play a particular sound, play a particular video, navigate to a particular URL, load or instantiate a particular application, and so on. A person of skill in the art can readily appreciate that such examples are not exhaustive; any suitable action can be performed by a recipient's device in response to receiving an email including an embedded serialized object such as described herein.

For example, in other cases, an embedded serialized object may be used by a recipient's device to generate a graphical user interface. For example, a sender may send an email including an embedded serialized object that causes a recipient's device to display a survey when that email is opened. For example, the survey selections or choices may be predetermined responses to the sender's original email.

By selecting a survey option, the recipient's device may automatically generate a reply email directed by to the sender including the selection made by the recipient. For example, the sender may send an email to a recipient asking where the two should go to lunch. The sender defines three choices of Restaurant A, Restaurant B, or Restaurant C. In this example, the recipient's device can extract the serialized object and parse information therein to generate a graphical user interface presenting the three options of Restaurant A, Restaurant B, or Restaurant C. In this example, the speed of interaction between the sender and the recipient is substantially increased. More specifically, the recipient need only make a single selection in order to provide a complete reply to the sender; the recipient is not required to spend time to draft a reply email, even a short draft email indicating the recipient's lunch preference.

In yet another example, an embedded serialized object may trigger several actions, some of which may be performed immediately, some of which may be scheduled to be performed at a later time, and some of which may be enqueued to be performed in response to occurrence of some defined event. Such serialized objects can be leveraged by senders and recipients of email alike to automate information exchange, follow-ups, and future messaging.

For example, in some cases, an individual (Person A) may wish to leverage email to introduce two personal or professional contacts (Persons B and C). Typically, Person A sends an email to both Person B and Person C. The email may include content describing each person's relationship to Person A, links to social or professional media, and so on. Thereafter, one or both of Person B or Person C may reply-all to thank Person A and to greet the other part. In certain cases, multiple emails may be generated, nearly all of which may clutter inboxes of Person A, Person B, and Person C.

The preceding example interaction can be substantially improved by leveraging actionable email serialized objects such as described herein. In particular, Person A may embed a serialized object that, without limitation: prevents Person A from being copied on any reply to Person A's message (e.g., Person A may only be added as a blind copy); schedules an automatic follow-up message to Person B and/or Person C in two weeks (or some other arbitrary time); prior to sending, causes Person A's device to automatically attach contact cards of Person B and Person C to the message; and so on.

The serialized object may also generate a custom button on devices of Person B and Person C that sends a pro forma reply email back to Person A, thanking Person A for the introduction. The embedded serialized object may define that the pro forma reply is only shown to Person A as a notification.

In this example, Person A may select contacts for Person B and Person C and select a button labeled "Introduce." After selecting this button, Person A's device may automatically (1) generate a pro forma email body and subject line (e.g., by populating a template), (2) generate and embed a serialized object into that email that defines any replies back to Person A should show to Person A only as a notification and (3) send that email including the serialized object to each of Person B and Person C.

The serialized object may also cause Person A's device to schedule at some future time a follow-up to Person B and Person C if Person A does not receive a reply email from either in a given time period. In this example, from Person A's perspective, only a single button press is required to (1) introduce two selected contacts and (2) schedule a follow-up to ensure that the introduction has been received.

When receiving this message from Person A, Person B's device may extract the embedded serialized object and generate a graphical user interface button labeled "Thank Person A." Upon selecting this button, Person B's device can automatically generate and send a reply email directed to Person A only that itself includes a serialized object that causes Person A's device to (1) show a notification and (2) hide the reply email from Person A's inbox.

Person B's device may also generate a graphical user interface button labeled "Schedule Meet-up with Person B." Upon selecting this button, Person B's device can automatically generate and send a reply only to Person C that itself contains an embedded serialized object including Person B's calendar availability for an upcoming time period, along with a listing of Person B's favorite coffee shops or restaurants.

When Person C's device receives this message from Person B, it can extract the serialized object and generate a graphical user interface displaying Person B's calendar availability (which may be presented alongside Person C's availability), and providing one or more selectable elements each corresponding to a restaurant or coffee shop suggested in Person B's email. Upon making a selection, Person C's device can automatically generate a reply email back to Person B.

As may be appreciated by a person of skill in the art, in this example, a task of introducing two contacts via email, and receiving and consuming replies thereto, can be performed in a substantially automated manner, triggered only by a single button press initiated by Person A. From Person B's perspective, the task of thanking Person A requires only a single button interaction, and likewise the task of scheduling a meeting with Person C only requires a single button interaction. From Person C's perspective, the task of scheduling a meeting with Person B only requires a single selection of a meeting location.

A person of skill in the art may readily appreciate that actionable serialized objects as described herein can be configured and/or leveraged to automate and/or assist with multiple different personal or team workflows; these preceding examples above are not exhaustive.

More generally and broadly, embodiments described herein can be used to provide facilitate convenient interactions and data exchange between one or more persons, leveraging existing email sending and receiving protocols as a communications backbone. This technique has many benefits and advantages many of which are described below.

For example, in some embodiments, embedded serialized objects may be leveraged to, without limitation: to facilitate meeting scheduling (e.g., a first person engages a first button on their device to automatically determine a suitable meeting time, triggering a graphical user interface to render at a recipient soliciting a selection by the recipient of a suitable time and/or location); to facilitate file downloads or file exchange (e.g., a first person engages a first button to request a file from a second person, whose email client application automatically locates the file and attaches it to a response email); to facilitate multi-factor authentication (e.g., an embedded serialized object includes a cryptographic key used to access a service); and so on. More generally, it may be appreciated that a system as described herein can be configured to leverage email protocols and embedded serialized objects to communicably couple two or more recipient electronic devices. More specifically, recipient electronic devices executing instances of email client applications can perform functions, exchange information, launch applications, obtain sensor readings, initiate communication sessions (e.g., SIP), establish data communication channels (e.g., tunnels, secure shells, and so on), exchange cryptographic keys, and so on.

In further examples, embedded serialized objects as described herein can communicably couple multiple devices together. For example, an embedded serialized object send to a group of recipient addresses can instruct each device to launch a video conferencing software. In this example, a sender of a single email can automatically initiate a video conference with multiple participants without requiring those participants to manually launch specific software, enter meeting information or credentials, and so on.

Such use cases may be of particular benefit to persons that are unfamiliar with particular technologies or how to leverage them. For example, an embedded serialized object sent to an email client of person with disability or a novice technology user can greatly improve that person's interaction experience with technology and, additionally, with the sender of the email.

In yet further examples, embedded serialized objects as described herein can communicably couple recipient devices together. For example, an embedded serialized object can include a cryptographic key such as an SSH key that causes a recipient device to reverse tunnel to the sender's recipient device. Such constructions can be leveraged by information technology support staff when debugging recipient issues.

In yet further examples, embedded serialized objects as described herein can be leveraged as a proxy. For example, an embedded serialized object can instruct a recipient device to access a web page, API, or service, and to return results of that access to the sender of the email.

In yet other examples, embedded serialized objects as described herein can be leveraged for parental or other administrative control purposes. For example, an embedded serialized object may instruct a recipient device to generate a use report including information such as current network connections, application use, sensor outputs and so on. This information can be returned to the sender of the email.

More generally and broadly, as described herein, a recipient electronic device (also referred to herein as a "client device") can execute a email client application, configured as described herein, that extracts the embedded information and/or instructions (referred to herein as a "serialized object") and can cause the client device to perform one or more system-level and/or application-level functions (in sequence or in parallel, substantially simultaneously), automatically, and according to one or more instructions or data items defined in the serialized object.

As a result of these constructions, a sender of an email can inform and/or otherwise dictate (1) how that email is consumed by a recipient, (2) how that email is consumed and/or processed by a recipient's electronic device, and/or (3) what function or functions a recipient electronic device can or should perform in response to receiving a message from that sender.

Example ways by which the manner a recipient consumes an email received by an email client application, such as described herein, can include, but are not limited to: suppressing display of an email from an email list (also referred to as an "inbox"); displaying an email in a different manner than other emails; displaying content of an email in a different user interface location, separate from the user's inbox (e.g., a tab or location dedicated to different message types, such as social media messages, software service notifications, shopping messages, and the like); and the like.

Example functions that can be performed by an email client application in response to receiving an email including a serialized object such as described herein include, but are not limited to: suppressing display of an email from an inbox and, instead, generating a native application notification formatted according to a serialized object extracted from the mail message; suppressing display of an email from an inbox and, instead, generating a native application notification with content defined by, or extracted from, a serialized object extracted from the mail message; displaying a received email according to, or otherwise informed by, a format definition extracted from a serialized object extracted from the email; displaying an already-received email or a set of already-received emails, according to, or otherwise informed by, a format definition extracted from a serialized object extracted from a newly-received email; and the like.

Such tasks may be performed immediately and/or may be scheduled to be performed at a future time and/or may be enqueued to be performed in response to a particular event, such as receiving a particularly-formatted email or serialized object such as described herein.

Example functions that can be performed by a recipient client device, such as described herein, in response to an email client application executed by that end user client device receiving an email including a serialized object such as described herein include, but are not limited to: accessing a sensor (e.g., a gyroscope, an accelerometer, a global positioning system sensor, a battery level sensor, a camera or image sensor, a light sensor, an acoustic sensor, or an environmental sensor such as a temperature sensor, humidity sensor, hygrometer, barometer, air quality sensor, and so on) of the client device and obtaining a state or status of the sensor; performing an action with a haptic output element of the client device; performing a disk-level action (e.g., add a file, delete a file, move a file, and so on) outside of the context or sandbox of the email client application; and so on.

In further examples, multiple functions can be performed by the recipient client device in a workflow, program, or other order or sequence to confer additional benefits to the recipient beyond the convenience of simply receiving and consuming an email. For example, a recipient client device can determine its location in response to receiving an email (e.g., via a Bluetooth component, a Wi-Fi component, a global position system sensor, and so on). In these examples, the device's location can be used to inform or control how one or more actions defined in an embedded serialized object are undertaken. For example, an embedded serialized object may define that if an email is received when the recipient is at home, the email may be suppressed until a starting time of the following workday, at which time the recipient's email client may display the message.

In yet other examples, one or more functions of a recipient electronic device can be delayed or enqueued until a sensor of the recipient electronic device transitions to a particular desired state. For example, an email related to a task the recipient of that message has to perform in a particular location (e.g., a trouble ticket to fix a particular piece of office equipment) can be sorted to the top of a message list when the end user is nearby that particular location. In one specific example, an information technology specialist may receive a number of messages on a daily basis each related to or associated with trouble tickets that require the user's physical presence in different locations.

In yet other examples, other sensors or systems of an electronic device that receives an email can be used. For example, internet requests for information can be initiated in response to receiving an email. As one example, if a recipient receives a message that is a receipt for a purchase, a request can be initiated to the credit card issuer such that the user's credit card balance may be shown. In another example, an application specific to the credit card issuer can be opened to a particular page (e.g., via deeplinking or another inter-application communication protocol). The foregoing examples are not exhaustive; other systems or combinations of requests can be triggered and/or otherwise leveraged in response to receiving an email, such as described herein.

These foregoing and other embodiments are discussed below with reference to FIGS. 1A—18. However, those skilled in the art will readily appreciate that the detailed description given herein with respect to these figures is for explanation only and should not be construed as limiting.

Figure 1B:
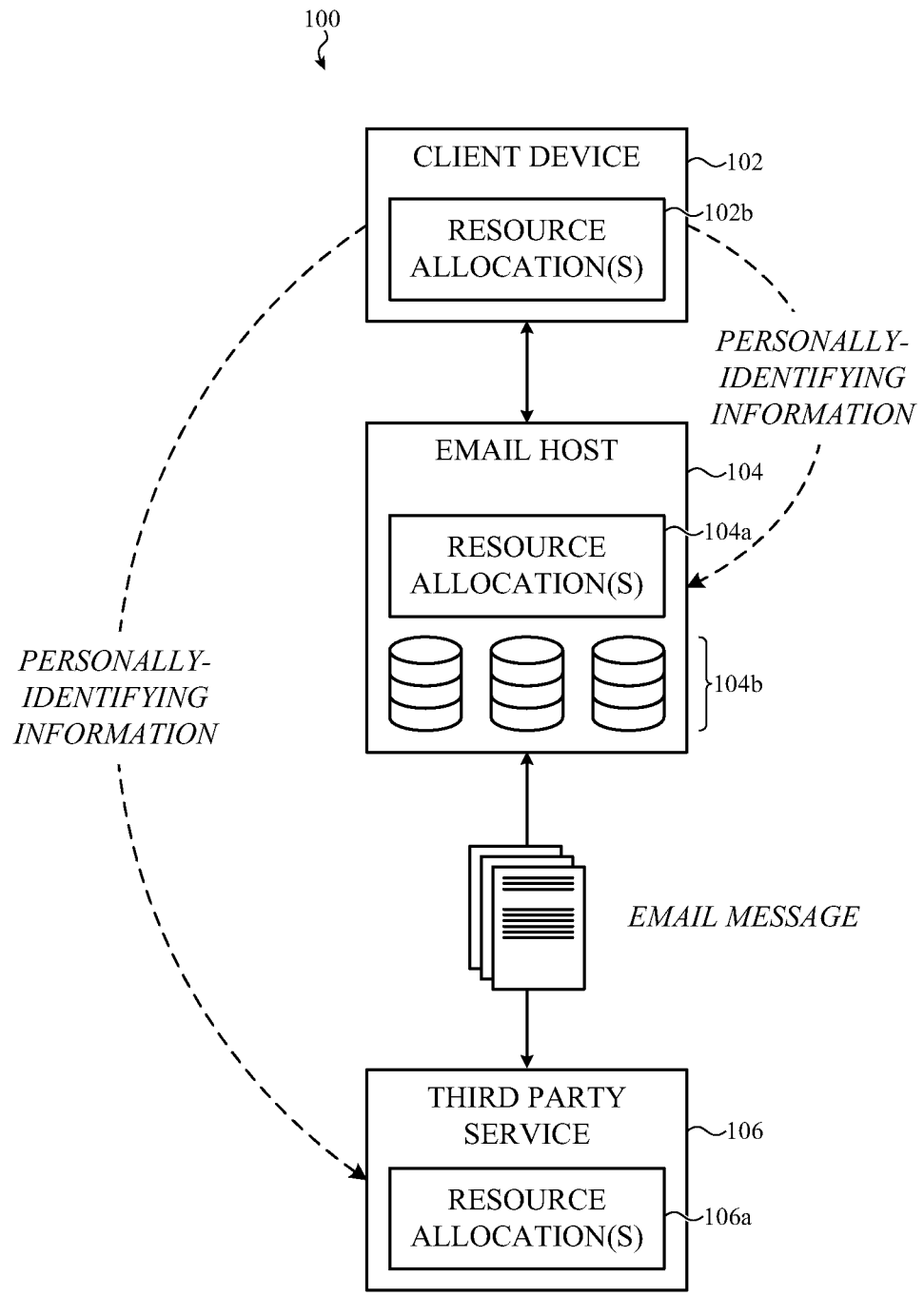
FIG. 1B is a system diagram of a system configured to send and receive email.

Generally and broadly FIGS. 1A-1B are system diagrams of a system configured to send and receive email.

FIGS. 1A-1B depict a system 100 configured to send and receive email messages. In this example embodiment, the system 100 includes a client device 102, an email host server 104, and a third-party service 106.

More specifically, in many implementations, the email host server 104 is communicably coupled to the third-party server 104 via one or more email message sending communication protocols, such as the Simple Mail Transfer Protocol ("SMTP"). Similarly, the email host server 104 is communicably coupled to the client device 102 via one or more email message receipt communication protocols, such as the Internet Message Access Protocol ("IMAP"), the Post Office Protocol (e.g., "POP3"), or other protocols, such as Microsoft's Exchange/ActiveSync protocol.

As a result of this architecture, the third-party service 106 can generate an email message and can communicate the email message to the email host server 104 which may store the email message in a database, such as one of the databases 104b shown in FIG. 1B.

As noted above, conventional email systems can be leveraged to collect substantial information about a recipient of email, even without any input of affirmative action provided by the recipient of those messages. For example, as shown in FIG. 1A, a client device such as the client device 102 may, from time to time, load one or more remote resources and/or may execute one or more embedded scripts within an email body. Execution of such scripts and/or loading of such remote resources can cause the third-party service 106 or other servers or systems to collect, without limitation: page interaction counts; dwell times; click-through statistics; client device IP addresses; client device location; client device types; client device browser footprint/fingerprint; and so on. In many cases, a user of email may be unaware that such information is being automatically transmitted to the third-party service 106 or to other third-party systems.

In other cases, convention email systems also collect substantial information from and describing a user just by virtue of the fact that the user's email are hosted by the email host 104. In particular, the email host may be able to collect, without limitation: a user's email sorting preferences; a user's email categorization preferences; a user's email inter-action preferences and habits; a user's email junk/spam classification data; a user's regular email partners and contacts; a list of user's regular online merchants; and so on. It may be appreciated that these foregoing described methods of collecting information describing a user of email are not exhaustive of the types of data that can be collected by a conventional system. In FIG. 1B, such information is identified as "personally identifying information."

By contrast, as noted above, a system as described herein such as the system 100, can preprocess messages and/or parse incoming messages for one or more payloads or serialized objects, thereby preventing any third-party tracking scripts from executing, preventing any remote resources from loading, and removing a need to manually categorize, sort, or otherwise interact with email messages. Such embodiments are described in greater detail below.

In particular, for embodiments described herein, a client application 102a instance executes over one or more computing resources of the client device 102 (such as the resource allocation 102b shown in FIG. 1B), and can generate and submit a request to the email host server 104 to receive a copy of a new email message, served from one of the databases 104b of the email host server 104. Thereafter, the client device 102 and/or the client application 102*a* can perform one or more operations as described herein, such as parsing the email message for one or more payloads, one or more serialized objects, and/or may perform one or more classification operations such as described above.

More specific to the foregoing, the client device 102 can include one or more physical or virtual computing elements such as a processor, a working memory, and a persistent data store or persistent memory. In many embodiments, computer code defining an instance of the client application 102*a* can be stored at least in part in a persistent memory. Upon request, a processor of the client device 102 can be leveraged to access the persistent memory and load at least a portion of that computer code into the working memory, thereby at least partially instantiating an instance of the client application 102*a* as shown in FIG. 1A.

The client application 102*a* can be configured to generate or otherwise render a graphical user interface which can be shown on a display of the client device 102. The graphical user interface, as noted above, can be configured to display any suitable information related to email, email processing, or data obtained in response to a received email. Further examples of a graphical user interface as described herein are presented below with reference to FIGS. 3A-3F and to other figures.

The client device 102 can be any suitable electronic device. In many embodiments, as noted above, the client device 102 is a mobile electronic device such as a smart phone, a tablet computer, or a laptop computing device. These are merely examples; any suitable computing device or computing resource may be configured to, in whole or in part, instantiate a client application as described herein, such as the client application 102*a*.

It is appreciated that the foregoing embodiment depicted in FIG. 1A and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each server or service of the system 100 of FIG. 1A can be implemented in a number of suitable ways. As illustrated, the email host server 104, the third-party service 106, and the client device 102 each includes one or more purpose-configured components, which may be either software or hardware. In particular, it may be appreciated that although these functional elements are identified as separate and distinct devices (e.g., servers) that can each include allocations of physical or virtual resources (identified in FIG. 1B as the resource allocations 102*b*, 104*a*, and 106*a* respectively), such as one or more processors, memory, and/or communication modules (e.g., network connections and the like), that such an implementation is not required. More generally, it may be appreciated that the various functions described herein of a host server 102 can be performed by any suitable physical hardware, virtual machine, containerized machine, or any combination thereof.

The foregoing embodiment depicted in FIGS. 1A-1B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2:
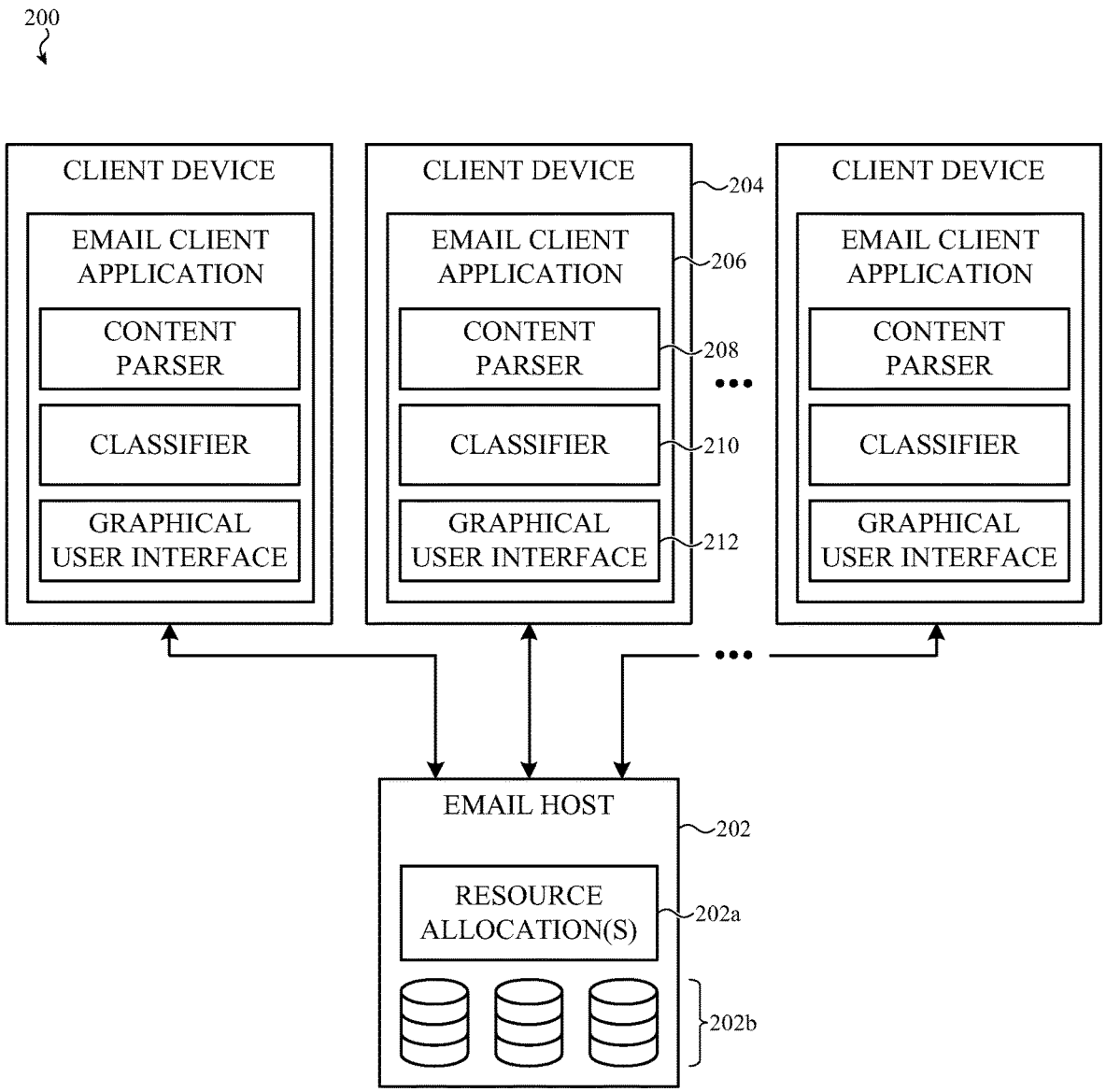
FIG. 2 is a simplified diagram of a client device executing a client application configured to send and receive email, the client application including a content parser and a classifier, such as described herein.

For example, FIG. 2 is a simplified diagram of a system 200 including a client device executing a client application configured to send and receive email, the client application including a content parser and a classifier, such as described herein.

In particular, as with the embodiments depicted in FIGS. 1A-1B, the system 200 includes an email host 202 supported by a set of virtual and/or physical computing resources, identified as the resource allocations 202*a*, and one or more databases 202*b*.

The email host 202 can communicably couple to one or more client devices, such as described herein. The email host 202 can communicably couple to any suitable number of client devices, but for simplicity of illustration, three discrete client devices are shown, one of which is identified as the client device 204.

As with other embodiments described herein, the client device 204 instantiates an email client application 206 by leveraging a processor and/or a memory of the client device 204. In these embodiments, the email client application 206 can include a content parser 208, a classifier 210, and a graphical user interface 212.

As a result of these constructions, when an email is received from the email host 202, that message can be first classified by the classifier 210. Based on an output of the classifier, one or more parsers, such as the content parser 208, can be selected and executed. In particular, the content parser 208 can be configured to extract a particular value, a particular data type, and so on and can be configured to provide an output to one or both of the graphical user interface 212 or the classifier 210. In particular, as noted above, in some examples, outputs from the parser (or more than one parser) can be combined together and submitted as input to the classifier 210 (or another classifier), or alternatively, outputs from the parser can be displayed in a datatype specific section of a graphical user interface, such as the graphical user interface 212.

Generally and broadly, FIGS. 3A-3F depict example graphical user interface that can be rendered by a client application executing over a client device, such as described herein. These example user interfaces may be rendered or otherwise generated by a client device, such as described herein. It may be appreciated that these user interfaces are not exhaustive examples of user interfaces, layouts, or user experiences that may be possible in view of the embodiments described herein. In particular, these example user interfaces are understood as merely examples and that any suitable user interface can be used.

Further, although these embodiments depict an example user interface rendered by a client application executed by a client device that takes the form of a table computer, this is merely one example. In other cases, other mobile or portable electronic devices can render a graphical user interface such as depicted and described in reference to FIGS. 3A-3F. In different implementations, different layouts and/or relative size of components may be used. For example, it may be appreciated that for a client device configured to execute on a cellular phone, the user interfaces shown in FIGS. 3A-3F may be rendered in scaled manner.

In yet other embodiments, an electronic device that is a client device communicably coupled to an email host server and that is configured to execute an instance of a client application as described herein can be a stationary electronic device such as a desktop computer or server system configured to present a web user interface that can be accessed from a browser application.

FIGS. 3A-3F depict an example client device executing an instance of an email client application configured to classify a received email by leveraging a classifier, parse information from that received email based on a determine class of that email, and to display one or more data items parsed/extracted from the received email into a dedicated user interface location of a graphical user interface of the email client application.

In particular, for these figures, the client device 300 includes a housing 302 that is configured to enclose and support internal components of the client device. In another phrasing, the housing 302 defines an interior volume into which electronic and/or mechanical components of the client device 300 can be disposed.

The client device 300 can be implemented as any suitable electronic device. In the illustrated embodiment, the client device 300 is a tablet device, but as noted above, this is merely one example.

Within the housing 302 of the client device 300 can be disposed one or more electronic components, such as a battery, a processor, a display, one or more input/output systems, a working memory, a long term memory, a set of sensors (e.g., global positioning system sensors) and so on. Each of these elements can be disposed entirely or partially within the housing 302. For simplicity of description, most of these elements are not shown in FIGS. 3A-3F; only a display 304 is partially visible in the depicted view.

As noted above, in many implementations at least one processor of the client device 300 can be configured to access executable instructions and/or one or more executable binary files or other media (collectively, "assets") stored in persistent or longer term memory. After accessing one or more asset from the persistent memory, the processor may be configured to load at least a portion of the accessed assets into working memory, thereby instantiating an instance of a client application, as described above.

The client application can be configured to leverage the display 304 to render a graphical user interface 306. The graphical user interface 306, as noted above, can be configured to define an active display area that includes one or more user interface elements that are each associated with a particular defined function that may be performed by the client application.

For example, in many configurations, the graphical user interface 306 of the client application can be configured to include a view selector group 308. The view selector group 308 can define a group of individual user interface elements that, when engaged by a user of the client device 300 cause the client application to display or to hide one or more groups of user interface elements.

In the illustrated embodiment, six discrete view selector elements are shown in the view selector group 308. It may be appreciated, however, that these different view selector elements are merely examples; in other embodiments other elements can be configured in different ways.

In this example, the view selector group 308 includes a task view selector 310, a reading view selector 312, a dashboard view selector 314, a file view selector 316, a priority message view selector 318, and a notification view selector 320.

In this embodiment, all the view selectors of the view selector group 308 are implemented as buttons that may be pressed by a user or otherwise clicked by a cursor or mouse pointer. In some cases, the display 304 of the client device 300 can include a touch sensor. In such examples, each of the view selectors of the view selector region 308 can be touch-sensitive regions that, when pressed by a user of the client device 300, cause the client application to perform a function, such as changing a currently displayed view.

Each of the views of the view selector region 308 can be associated with a particular type of message (e.g., classification of message, such as described above) and/or a particular type of data that can be extracted from one or more messages.

For example, the task view selector 310 may be configured to display email messages and/or data extracted therefrom that are classified by a classifier as messages associated with and/or assigning a particular task. As one example, an email message classified as a task message may be generated by a SaaS platform configured for collaborative work, such as a project management application. Such applications may, from time to time, generate email messages when new work is assigned to a user of that system.

In such examples, the email message may be received by the client device 300 or, in particular the client application executing on the client device 300, and may be provided as input to a classifier specific to the SaaS application or, in other cases, a classifier trained to identify task-based emails. Once at least one classifier as described herein labels the received email as a task email, one or more parsers can be selected. For example, a selected parser may be a parser configured to extract task information from a particular email received from a particular SaaS product vendor.

Once one or more parsers process the email message as received, outputs therefrom can be reformatted as one or more items in a list that can be presented in the task view selector 310. More specifically, in some cases, an email may contain more than one task and, thus, more than one item may be added to a task list that can be presented in the task view. In some cases, task counts can be shown in a counter bubble 310a, but this is not required of all embodiments. This view is described in greater detail below with reference to FIG. 3C.

As with other views and view selectors described herein, the reading view selector 312 may be configured to display information extracted from one or more emails that relates only to long-form textual data meant to be consumed by reading, such as newsletters or updates. As noted with respect to other embodiments described herein, an incoming message may be categorized, may be passed to one or more parsers, and one or more items of data can be extracted can be output from those parsers. That data, in turn, can be used to populate one or more portions of the reading view. For example, in some embodiments, a parser can be configured to extract an article title, another parser can be configured to extract an article publication date, and another parser can be configured to extract an article text or body. In some cases, the email may only include an article preview.

In such examples, at least one process of the client application (e.g., a parser) can be configured to click through a link in the email body in order to access the full content of the article. As with the task view selector, in some embodiments although not required, a counter bubble can be shown that lists a number of articles that are unread. This view is described in greater detail below with reference to FIG. 3B.

Similarly, the dashboard view selector 314 may be configured to display information extracted from one or more emails that relates only to discrete data points contained in emails, metadata about which is intended to be consumed by a recipient of those emails (e.g., status updates, notification emails, financial data, and so on). In other words, metadata about particular messages or message types considered in aggregate may be presented in the dashboard view accessed by the dashboard view selector 314. As one example, the dashboard view may tally how many messages from a particular sender have been received in a particular amount of time. In another example, the dashboard view may show how many days on average an email message is unread otherwise not acted upon. These examples are not exhaustive; any suitable quantity of information can be displayed in any manner in the dashboard view. As noted with respect to other embodiments described herein, an incoming message may be categorized, may be passed to one or more parsers, and one or more items of data can be extracted can be output from those parsers. That data, in turn, can be used to populate one or more portions of the dashboard view. This view is discussed below with reference to FIG. 3D.

The file view selector 316 may be configured to display information extracted from one or more emails that relates only to attachments to emails received. As noted with respect to other embodiments described herein, an incoming message may be categorized, may be passed to one or more parsers, and one or more items of data can be extracted can be output from those parsers. That data, in turn, can be used to populate one or more portions of a file view shown when the file view selector 316 is selected. This view is discussed with reference to FIG. 3E.

The notification view selector 320 may be configured to display information extracted from one or more emails that relates only to short-form status updates or responses, such as SaaS status updates, shipping notifications, or other short-form low information messages. As noted with respect to other embodiments described herein, an incoming message may be categorized, may be passed to one or more parsers, and one or more items of data can be extracted can be output from those parsers. That data, in turn, can be used to populate one or more portions of a list or log of notifications that may be sent to the user via a native notification API. This view is discussed with reference to FIG. 3F.

Figure 3A:
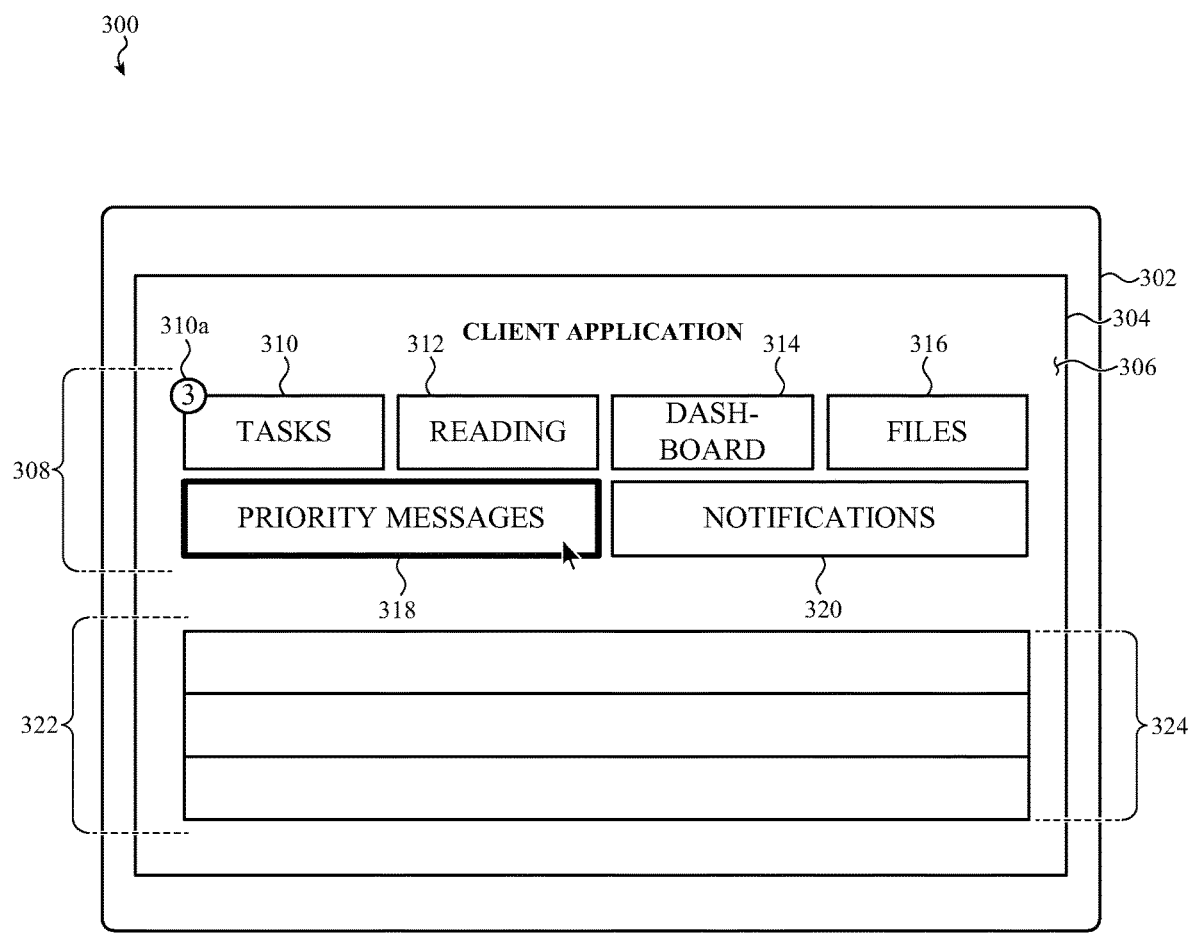
FIG. 3A depicts an example client device executing an instance of an email client application configured to classify a received email by leveraging a classifier, parse information from that received email based on a determine class of that email, and to display one or more data items parsed/extracted from the received email into a dedicated user interface location of a graphical user interface of the email client application.

FIG. 3A also includes the priority message view selector 318. This view may be configured to display information extracted from one or more emails that relates only to messages that are categorized as high priority and/or personal or professional messages that should not be missed or otherwise overlooked. As noted with respect to other embodiments described herein, an incoming message may be categorized, may be passed to one or more parsers, and one or more items of data can be extracted can be output from those parsers. That data, in turn, can be used to populate one or more portions of the priority message view.

In this view one or more messages can be shown in a view content area 322. The view content area 322 may change what it displays based on which content view is selected at a given time. In FIG. 3A, the priority message view selector 318 is selected and, as a result the view content area 322 displayed a message list 324 that lists messages a classifier, as described above, has determined is a personal or professional message that should be consumed as a conventional email.

Figure 3B:
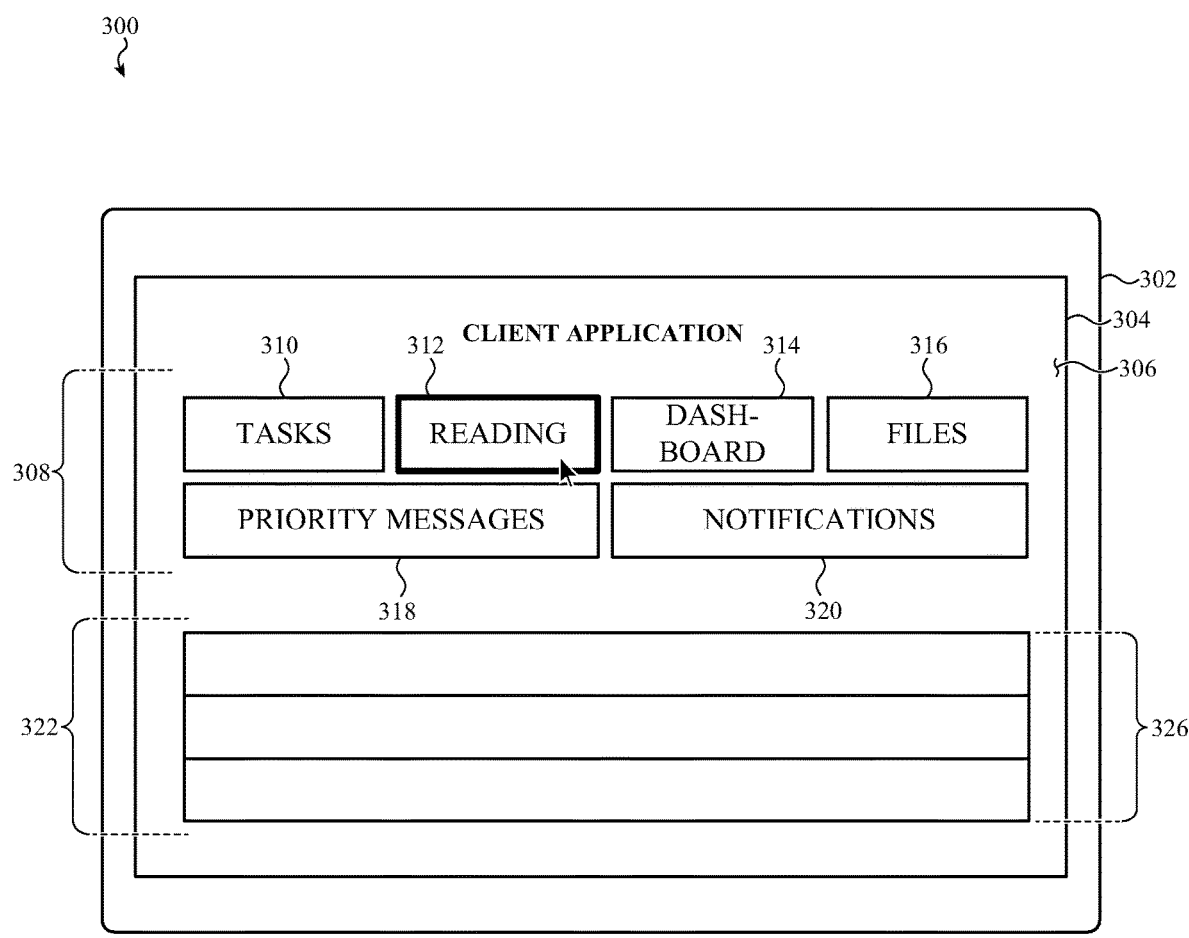
FIG. 3B depicts another visual composition of the graphical user interface of the email client application of FIG. 3A.

FIG. 3B depicts another visual composition of the graphical user interface 306 of the email client application of FIG. 3A. In this example embodiment, the view content area 322 may be configured to display information and user interface elements related to data or information associated with emails containing content intended to be consumed by reading. In other words, the view content area 322 may be configured as a reading view that may be shown or otherwise displayed when a user of the client device 300 interacts with the reading view selector 312. More specifically, the view content area 322 can be configured to display an article list 326 that contains only article content extracted from received email messages. The articles of the article list 326 can be sorted or presented in any suitable manner, such as chronologically, by source, by topic, by article length, and so on. Any suitable information can be extracted by any suitable number of parsers to be displayed in the article list 326. As noted above, example information may include: article title; article author; publication date; article text; embedded images; and so on.

Figure 3C:
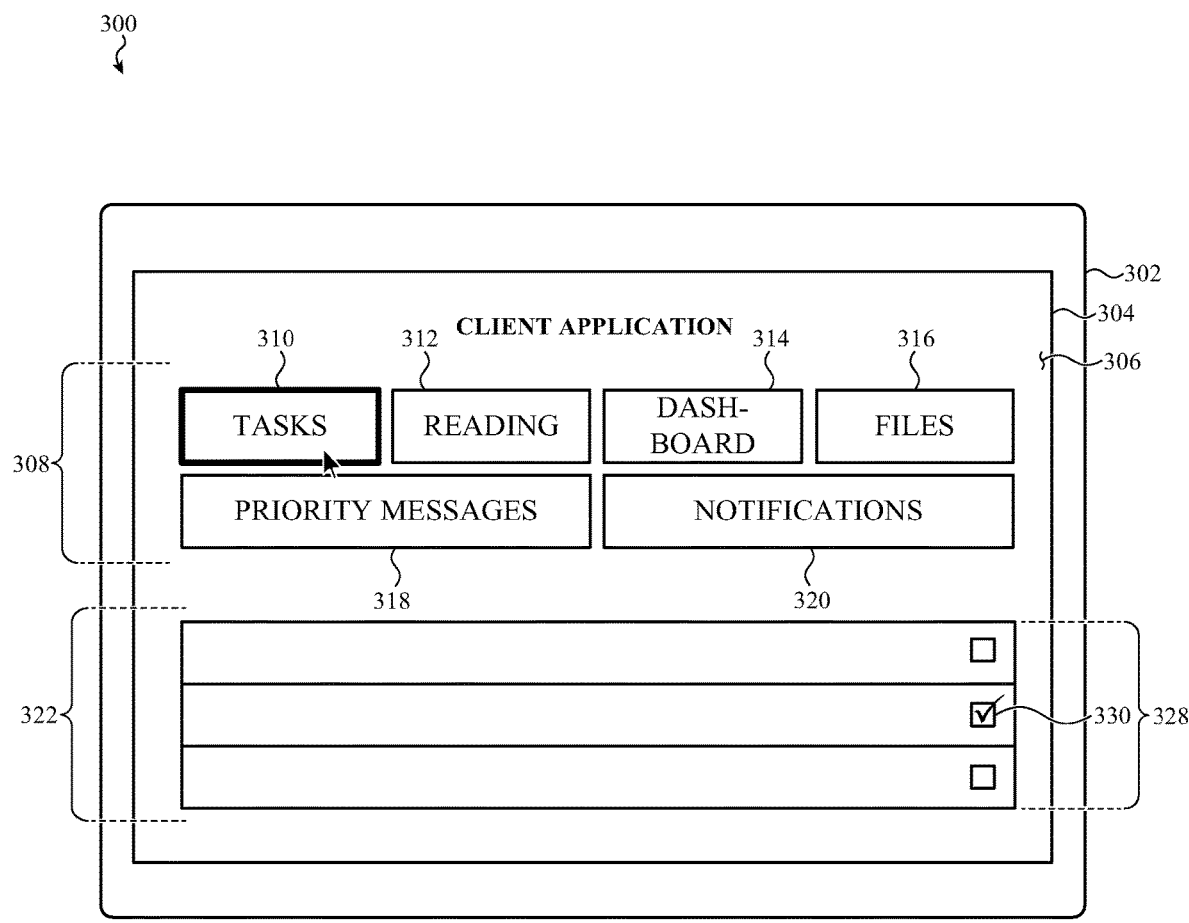
FIG. 3C depicts another visual composition of the graphical user interface of the email client application of FIG. 3A.

FIG. 3C depicts another visual composition of the graphical user interface 306 of the email client application of FIG. 3A. In this example embodiment, the view content area 322 may be configured to display information and user interface elements related to data or information associated with emails identified as, or associated with, tasks. In other words, the view content area 322 may be configured as a task view that may be shown or otherwise displayed when a user of the client device 300 interacts with the task view selector 310. More specifically, the view content area 322 can be configured to display a task list 328 that contains only task items extracted from emails received by the client application. The tasks of the ask list 328 can be sorted or presented in any suitable manner, such as chronologically, by source, by topic, by task complexity, by task assignee, and so on. As with other described embodiments, any suitable information can be extracted by any suitable number of parsers to be displayed in the task list 328. For example, in some embodiments, a task can be created by a parser receiving as input an email containing a phrase like "can you have this done by Friday?" In such an example, a parser may be configured to identify a due date. Another parser can be configured to leverage a natural language processing module to determine that, contextually, an earlier message in a thread containing the processed message referenced "fix floor six network switch." These two extracted data items can be used to create a task item that can be presented in the task list 328. In some cases, another parser can be configured to detect whether a statement indicating that a particular task is complete has been made; if so, a completion mark 330 can be rendered alongside the associated task in the task list 328. This may be particularly useful for managers tracking work of a number of individual employees.

In these examples, as may be appreciated by a person of skill in the art, a parser as described herein can be configured to communicably couple to a task management software or API configured to track one or more tasks or projects. In these embodiments, a parser can be configured to extract one or more tasks from the remote task management system and display those tasks in the task list 328 alongside automatically generated tasks, such as described above. In this manner, it may be appreciated, that an email client application as described herein can be leveraged to aggregate information received in emails with information tracked by one or more third party services or platforms.

Figure 3D:
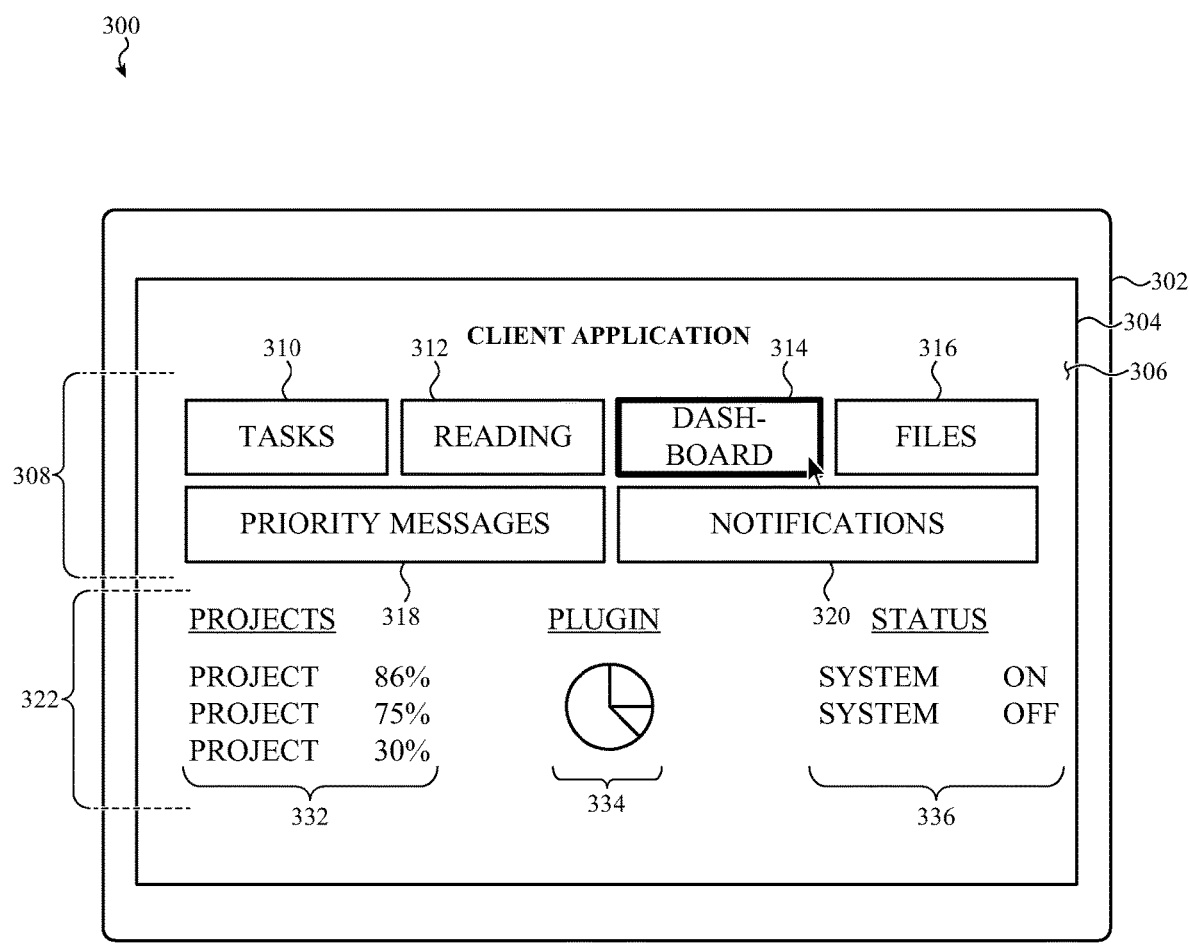
FIG. 3D depicts another visual composition of the graphical user interface of the email client application of FIG. 3A.

FIG. 3D depicts another visual composition of the graphical user interface 306 of the email client application of FIG. 3A. In this example embodiment, the view content area 322 may be configured to display aggregated information obtained from one or more emails, and/or one or more local databases and/or one or more remote databases or software services. In other words, the view content area 322 may be configured as a dashboard view that may be shown or otherwise displayed when a user of the client device 300 interacts with the dashboard view selector 314. In these examples, any suitable data can be extracted by leveraging any number of suitable parsers and can, thereafter, be reformatted or recast so as to be aggregated with other like data into one or more subviews of the dashboard view.

For example, in some embodiments, status of one or more tracked projects may be tracked in a project management subview 332. In other cases, a third party plugin or other data source (e.g., software service) can be queried and data resulting from that query can be shown in a third party plugin subview 334. For example, in some embodiments, the client application can be configured to communicably couple to an issue tracking system. In such examples, data from the issue tracking system can be shown in the third-party plugin subview 334. In some further examples, data obtained from the issue tracking system can be combined with data extracted from one or more email messages and shown collectively in the dashboard view.

Figure 3E:
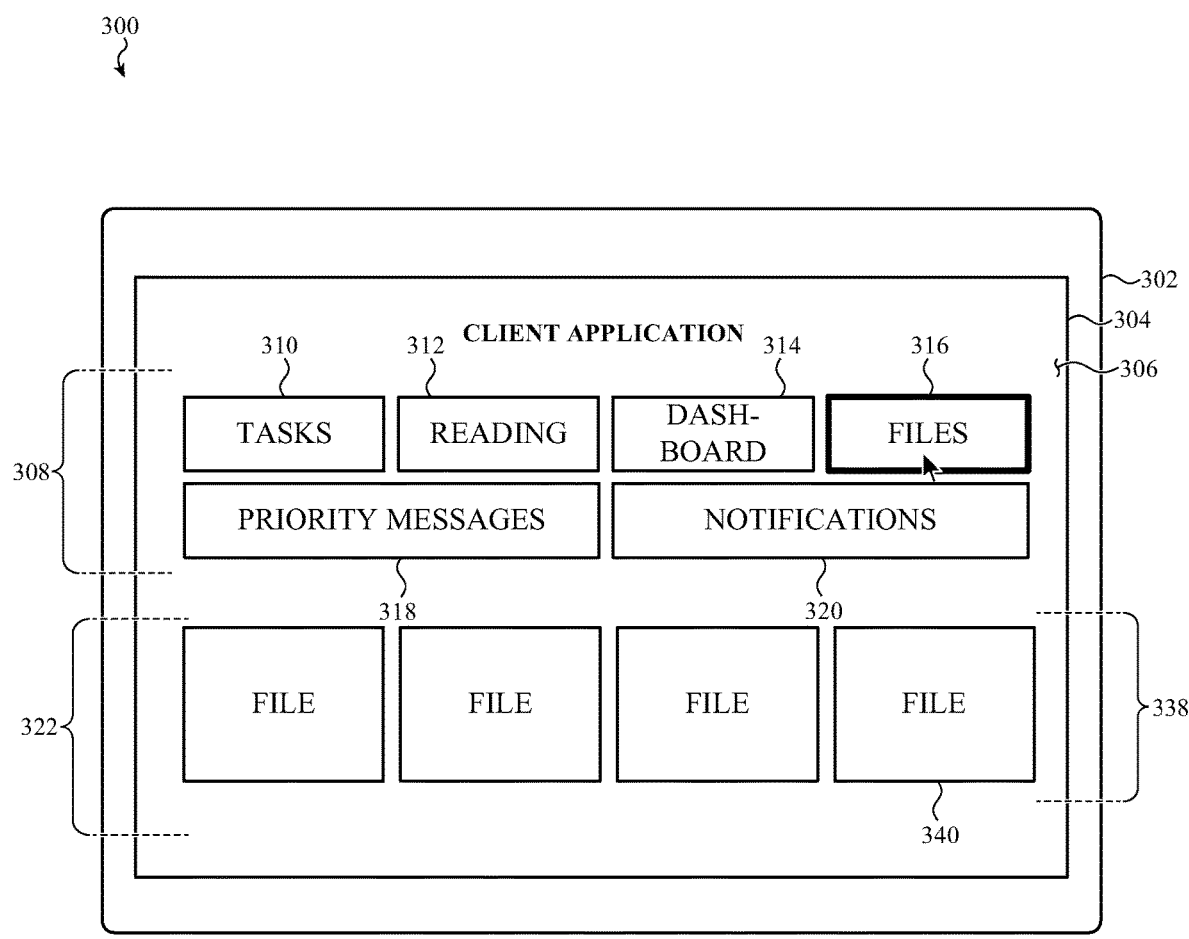
FIG. 3E depicts another visual composition of the graphical user interface of the email client application of FIG. 3A.

In still further examples, the dashboard view can also include a system status view that tracks system status emails received from one or more software as a service platforms. In these example embodiments, one or more parsers can be leveraged to obtain a system status information from an email and that data can be used to populate a system status subview 336, FIG. 3E depicts another visual composition of the graphical user interface 306 of the email client application of FIG. 3A. In this example embodiment, the view content area 322 can be configured to display a file list 338 that contains one or more icons of files received via email. One example file is identified as the file 340. These files can be extracted from emails, can be reformatted from email attachments (e.g., converting text documents to PDF), can be refactored documents (e.g., PDF documents OCR'ed or otherwise processed), or can be any suitable documents or files.

Figure 3F:
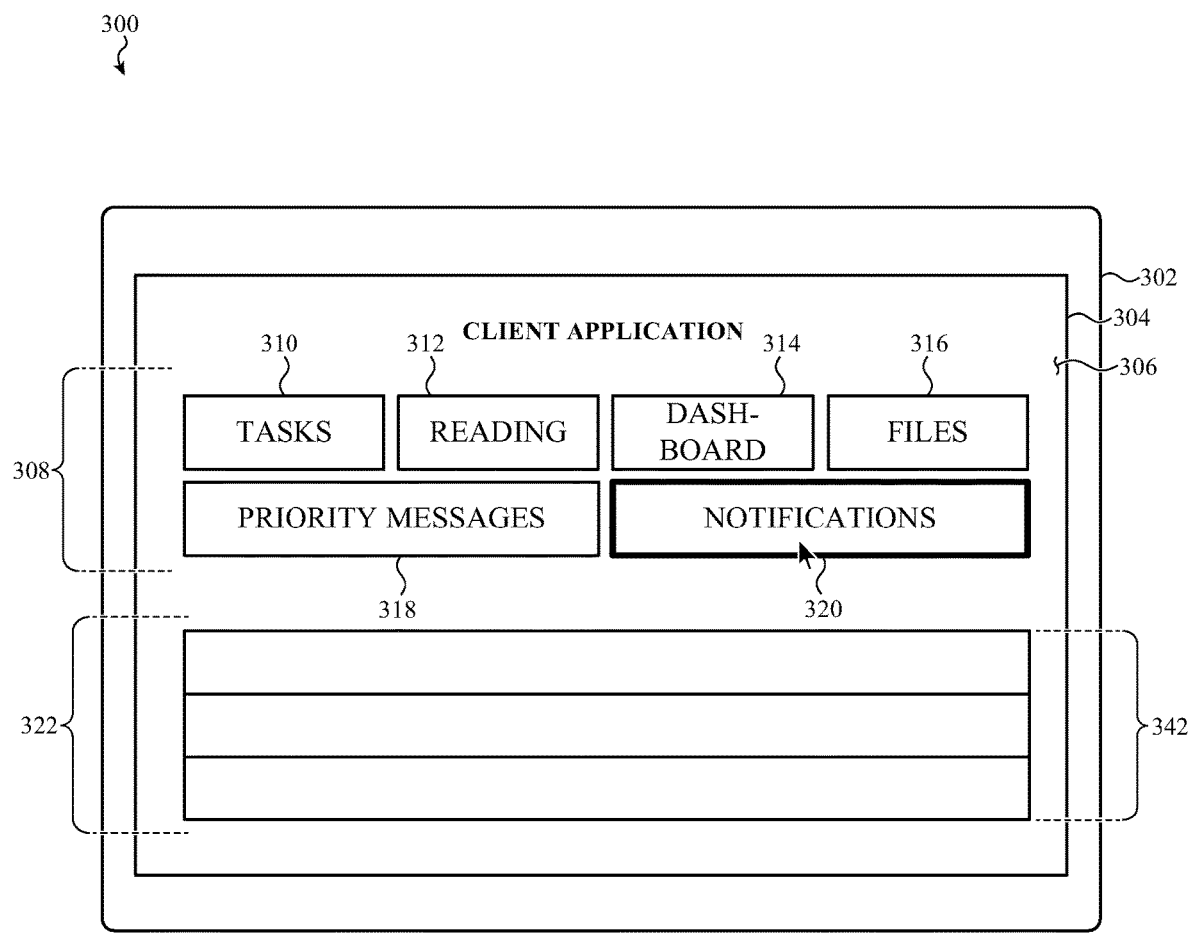
FIG. 3F depicts another visual composition of the graphical user interface of the email client application of FIG. 3A.

FIG. 3F depicts another visual composition of the graphical user interface 306 of the email client application of FIG. 3A. In this example embodiment, the view content area 322 can be configured to display a notification log 342 that, as described in greater detail below, can serve as a log of all notifications generated by the client application in response to an embedded payload or in response to a classifier determining that the message content was merely short-form low-information content.

These foregoing embodiments depicted in FIGS. 3A-3F and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
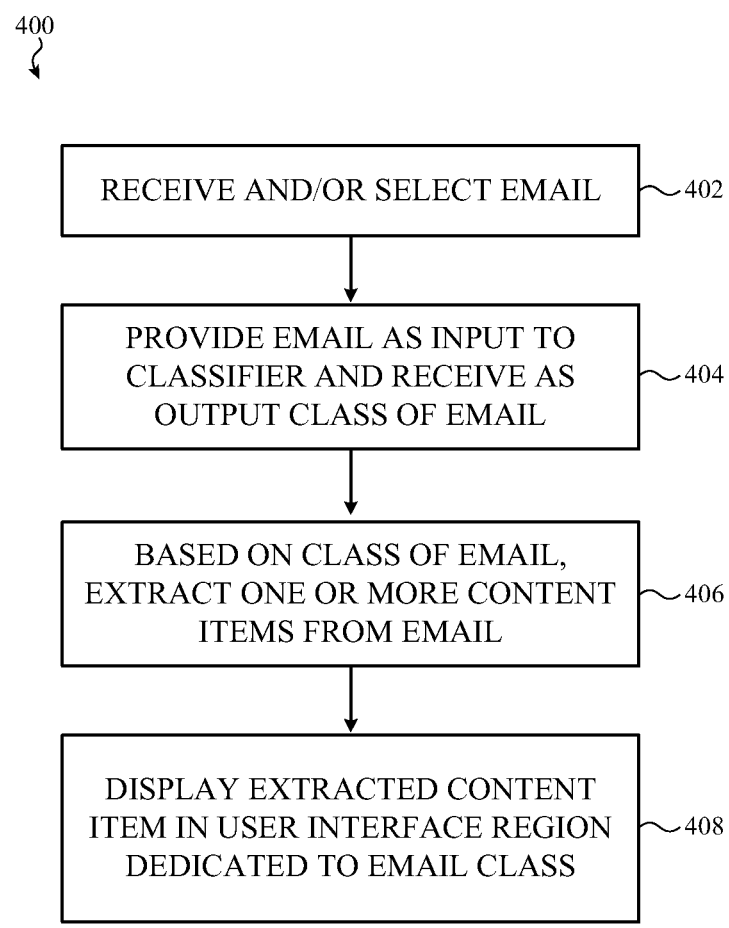
FIG. 4 is a flowchart depicting example operations of a method of classifying a received email message.

FIG. 4 is a flowchart depicting example operations of a method of classifying a received email message. The method 400 can be performed in whole or in part by a client application as described herein. In particular, the method 400 can be performed in whole or in part by a processor executing an instance of a client application as described herein. As noted above, the processor can be configured to access a persistent memory to obtain one or more assets that in turn can be loaded into a working memory in order to instantiate an email client application as described herein. However, it may be appreciated that these construction are not exhaustive; in some examples, the method 400 can be performed in whole or in part by other hardware, software, or virtualized hardware. As such, for simplicity of description and illustration, the method 400 is described in reference to a client application executing over a client device implemented as a tablet computing device (see, e.g., FIGS. 3A-3F).

The method 400 includes operation 402 in which an email is received or an existing email is selected. Next, at operation 404, the email is provided as input to a classifier, such as described above. The classifier is configured to provide as output a class or label assigned to the email message selected at operation 403. Thereafter, at operation 406, the class of the email identified at operation 404 can be leveraged to parse one or more content items from the email. Those content items can be extracted from the email header, from the email body, from the email subject, from the email sender, and so on.

Finally, at operation 408, one or more of the data items extracted at operation 406 can be displayed in a graphical user interface of the client device.

Figure 5A:
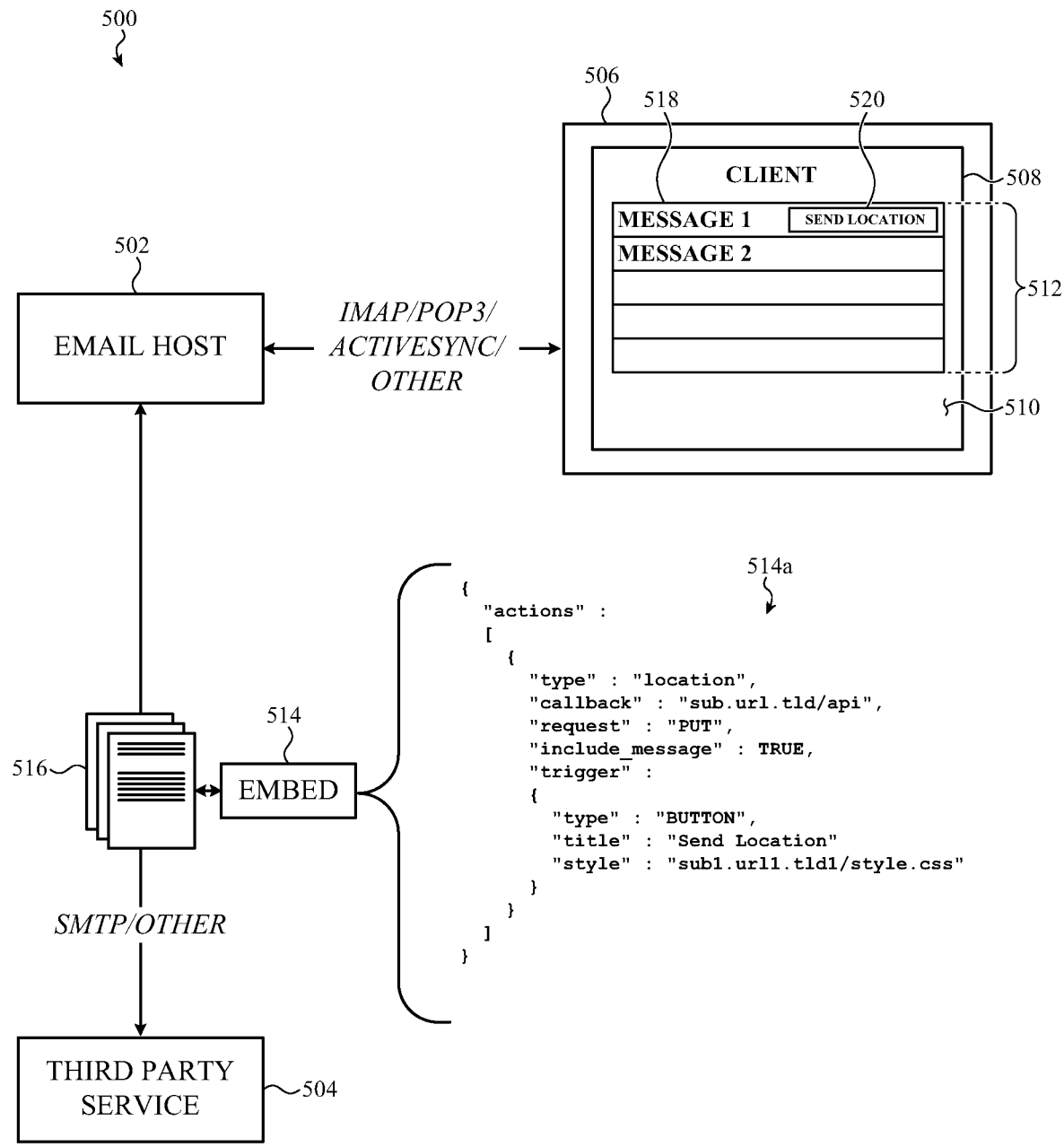
FIG. 5A depicts another system configured to send and receive payload-embedded email messages, such as described herein.
Figure 5B:
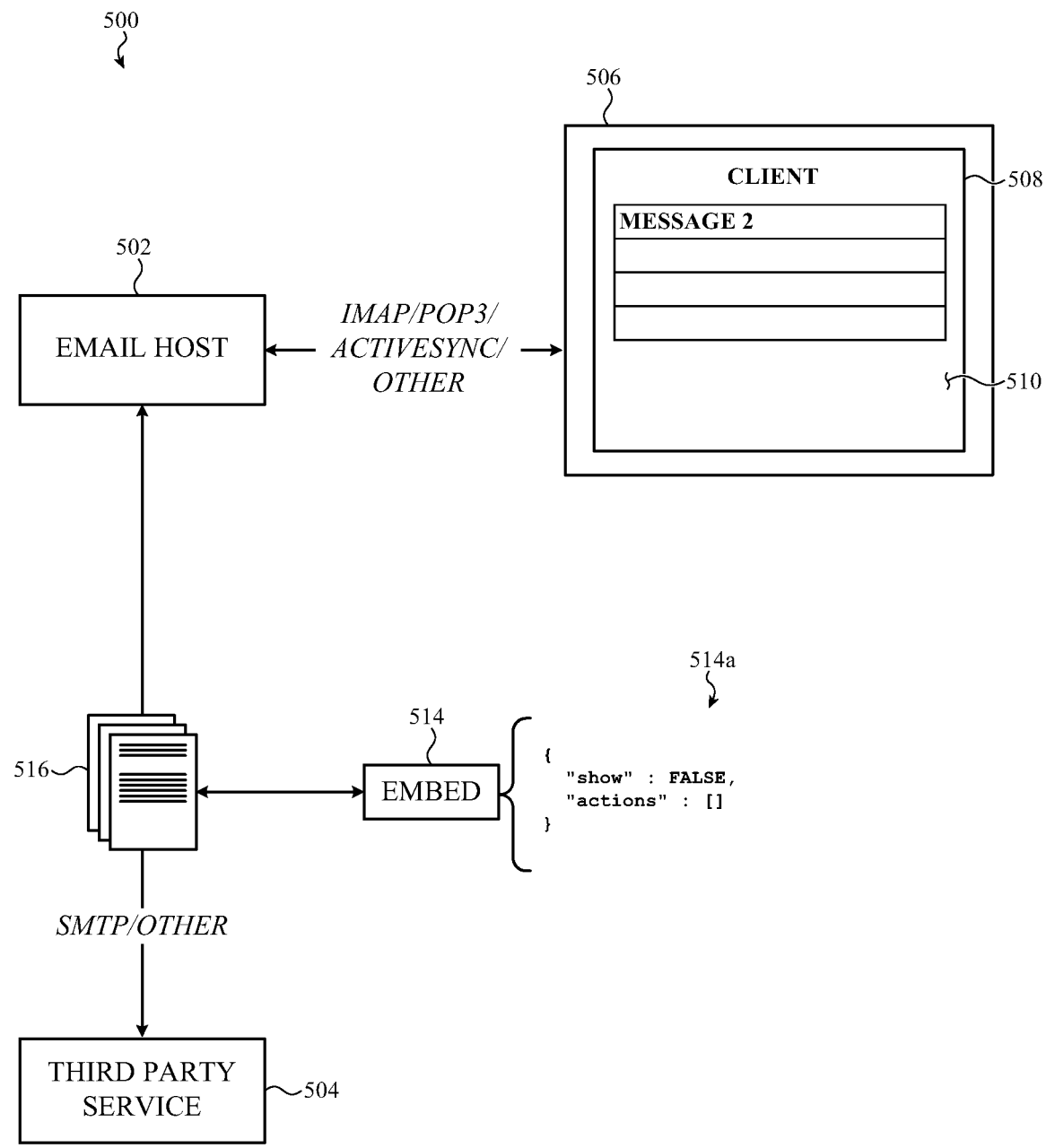
FIG. 5B depicts another system configured to send and receive payload-embedded email messages, such as described herein.

Generally and broadly, FIGS. 5A-5B depict system diagrams related to systems, such as those described herein, that send and receive email messages including a payload such as described herein.

FIG. 5A depicts another system configured to send and receive payload-embedded email messages, such as described herein. In this example embodiment, the system 500 includes an email host 502 that is communicably coupled to a third party server or service, identified as the third party service 504. As with other embodiments described herein, the third party service 504 is configured to generate an email message including a payload, such as described herein.

Once an email message from the third party service 504 is received by the email host 502, a client device 506 can be notified by the email host 502 that the message is available for download.

More specifically, as with other embodiments described herein, the client device 506 can include a processor (not shown) and a memory (not shown). The processor of the client device 506 can access the memory to retrieve computer code or instructions, that when executed by the processor cause the processor to operate with the memory (or another memory) to instantiate an instance of an email client application, such as described herein, that is configured to generate leverage a display 508 of the client device 506 to render a graphical user interface 510 to display one or more email messages in a message list 512 that are received by the email client application from the email host 502.

In this embodiment, as with others described herein, messages generated by the third party service 504 can include a payload, illustrated in figure as the embedded payload 514 inserted into the email message 516.

In this example, the embedded payload 514 includes a string value 514*a* encoding structured data in a JSON format. The embedded payload 514 includes a number of attributes, lists, and objects that each define a portion of an action item to be performed by the client device 506 when the client device 506 receives the email message 516. In this example, the embedded payload 514 includes instructions such that when the message is displayed as a row 518 in the message list 512, the row 518 can be rendered with an additional UI element 520 that, when clicked by a user, sends the user's location to a specified server via an HTTP PUT request. More specifically, in response to the embedded payload 514, the client device 506 can query a global positioning sensor of the client device 506 (or another location proxy, such as a Bluetooth beacon, a cellular radio address, or a Wi-Fi network address or B/SSID) and receive results of that query as input to provide to the address specified in the embedded payload 514.

This example embodiment is not exhaustive of the various tasks, operations, formats, or UI element modifications that can be performed when a payload such as the embedded payload 514 is received. For example, FIG. 5B depicts another system configured to send and receive payload-embedded email messages, such as described herein. The system in this embodiment can be configured in the same manner as the system 500 described in reference to FIG. 5A; this description is not repeated. In this embodiment, the embedded payload 514 defines for the client device 506 that display of the message 516 should be suppressed. Namely, the embedded payload 514 comprises an instruction to the email client application to suppress rendering of the email message 516 such that the display 508, rendering the graphical user interface 518, does not display any information related to the email message 516.

In yet a further example, a system configured to send and receive payload-embedded email messages can be configured in a different manner. For example, a location-based sorting action can be performed by the client device or, more specifically, the email client application executed by the processor of the client device. In this example, the embedded payload can instruct the client device to render a user interface in response to a determination of location using at least one location sensor within the client device. Example location sensors include global positioning sensors, Bluetooth communication components, Wi-Fi communication components, position sensors such as inertial measurement units, gyroscopes, and accelerometers. With said location information, the client device 506 can order messages based on the location information.

As a result of this configuration, the client device can display work-relevant messages only when the end user is physically at a work location and, similarly, can only display personal messages only when the end user is physically at home or, alternatively, not at a work location. In further examples, sorting may be more granular. For example, different messages relevant to different physical locations at a worksite may be shown when the user is physically present at those locations. For example, messages related to a particular meeting can be sorted to the top of a messages list when the user is physically present within a conference room. In another example, messages related to a particular product line can be shown when the user is within the assembly room for that product.

The foregoing examples are not exhaustive; other examples and other means of sorting messages and/or notifying a user of a new message (or an old message) can be used in accordance with the embodiments described herein.

Operations Associated with a Payload-Embedded Email Message

The foregoing example embodiments are not exhaustive of the various actions or tasks that can be performed by a system, such as described herein. As noted above, user interface element actions are merely examples. In other cases, user interface modifications may not be required or instructed by a payload, such as described herein. More specifically, in some examples, only background actions or action items may be performed.

Figure 6:
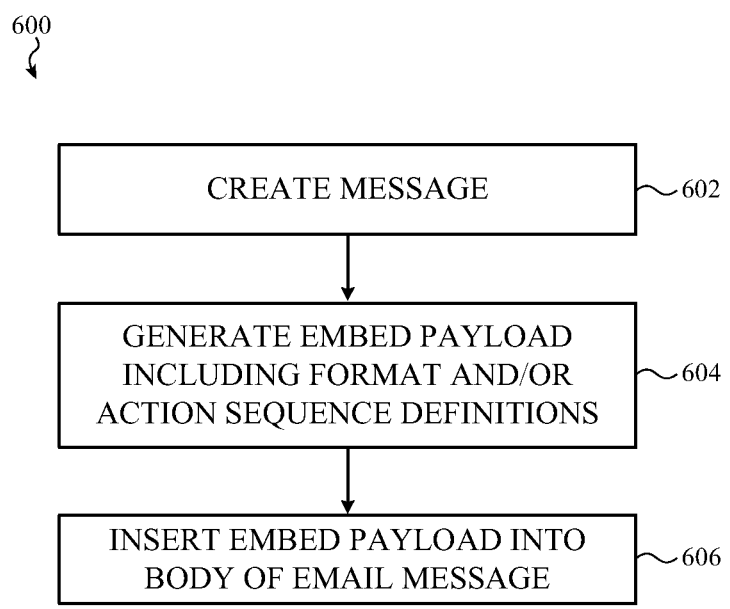
FIG. 6 is a flowchart depicting example operations of a third-party server performing a method of generating a payload-embedded email message, such as described herein.

FIG. 6 is a flowchart depicting example operations of a third-party server performing a method of generating a payload-embedded email message, such as described herein. As with other embodiments described herein, the method 600 can be performed by any suitable hardware or software, or combination thereof. In many cases, the method 600 is performed, at least in part, by a processor of a third-party server in response to an automated task executed by a collaboration tool, such as described herein. In other cases, the method 600 is performed in whole or in part, by an email drafting application operated by a real person operator.

The method 600 includes operation 602 at which an email message draft is created. Next, at operation 604, an embedded payload (referred to in the figure as an "embed payload") is generated, which as noted above can include or otherwise be expressed as a string representation of structured and computer-readable data. The payload can include one or more formatting instructions, action items, behavior settings, and so on. The payload can be encrypted or can be unencrypted. In many examples, the payload is JSON-formatted, but this is not required.

The method 600 includes operation 606 at which the payload can be inserted as a string into a body portion of the email message drafted/created at operation 602. The payload string can be inserted at any suitable portion of the email message. In other cases, the payload can be inserted into as a message header. In other cases, the payload can be inserted into in a CSS file associated with or linked in the email message. In still further examples, the payload can be saved in a database and a URL to the payload can be inserted into the email body. These foregoing examples are not exhaustive, as noted above, a payload such as described herein can be inserted into any suitable portion, as a whole or broken into parts, in any suitable encrypted or unencrypted manner.

As noted above, a method such as the method 600 can be leveraged and/or performed in whole or in part to affect any suitable function or operation of an electronic device—or combinations thereof arranged in a workflow or a set of parallel or series workflows—to provide one or more additional benefits or features to a recipient of an email message and/or to a sender of said email messages. Examples include, but are not limited to actions leveraging: graphical user interface components; notification components; hardware components local to a recipient electronic device; hardware components in communication with a recipient electronic device including industrial control appliances and home automation appliances; and so on. Any of these example functions or apparatuses can be used to confer one or more additional features to a recipient or sender of an email message without requiring that either the sender or recipient adopt a specialized messaging or chat application to exchange messages.

Figure 7:
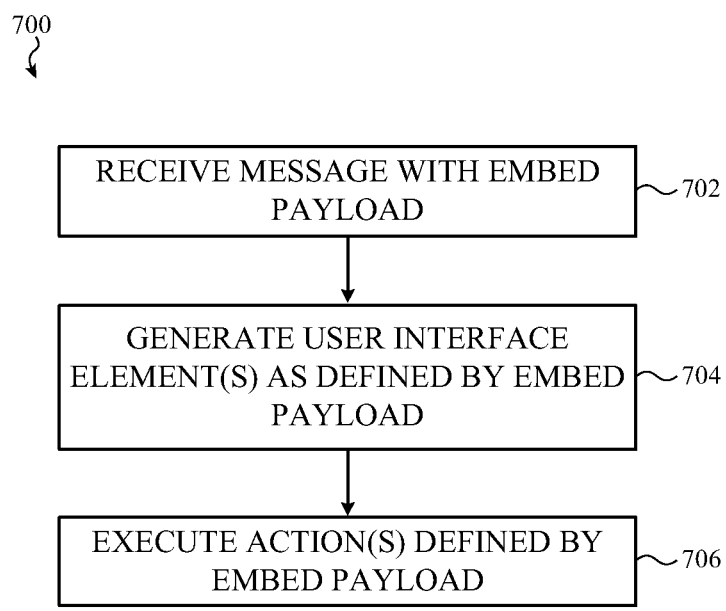
FIG. 7 is a flowchart depicting example operations of an email client application performing a method of processing a payload-embedded email message, such as described herein.

FIG. 7 is a flowchart depicting example operations of an email client application performing a method of processing a payload-embedded email message, such as described herein. As with other embodiments described herein, the method 700 can be performed by any suitable hardware or software, or combination thereof. In many cases, the method 700 is performed, at least in part, by a processor of a client device, executing an email client application.

The method 700 includes operation 702 at which a message with an embed payload is received by the email client application. As with other examples described herein, the email client application can extract the payload from the email message in any suitable and/or implementation-specific manner. In many cases, the email client application is configured to extract the payload as a string and, thereafter, generate a data object from the string.

Next, at operation 704 the method 700 advances to generate one or more user interface elements that are defined by the payload or, more specifically, the string value or data object derived from the received email message.

Next, at operation 706 the method 700 advances to perform (or schedule to be performed) on or more action items defined by the payload. As noted above, the action items can be performed in series or in parallel and may be any suitable action or set of actions. Examples include, but are not limited to: generating a notification; generating a sound; generating a haptic feedback; generating a request to a third-party server; receiving a response from the third-party server; querying a database; receiving a result from a query to a database; determining a state of a sensor; obtaining input from a sensor; generate a user interface element; generate a user interface element; hide a user interface element; change formatting of a user interface element; emphasize a particular email message or set of messages; hide a particular message or set of messages; log a user into a system or service; log a user out of a system or service; access a third-party image hosting website; connect to or disconnect from a particular network; perform a home or office automation task; and so on and the like.

Figure 8:
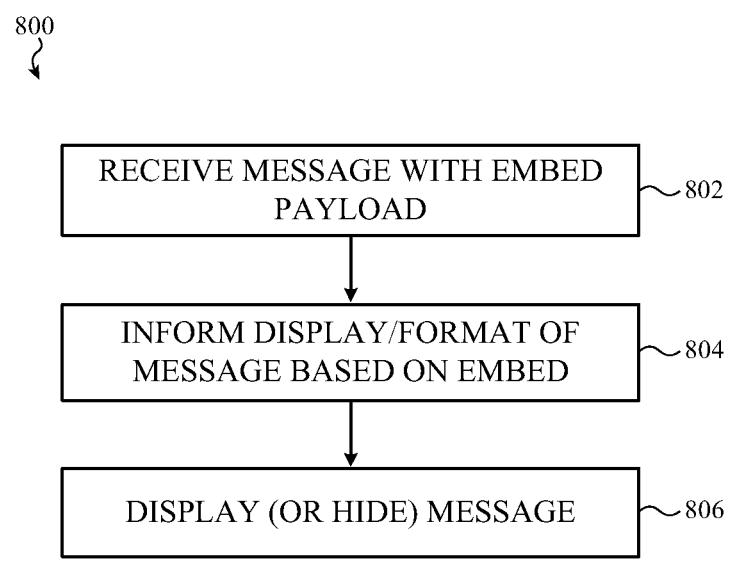
FIG. 8 is a flowchart depicting example operations of an email client application performing a method of processing a payload-embedded email message, such as described herein.

FIG. 8 is a flowchart depicting example operations of an email client application performing a method of processing a payload-embedded email message, such as described herein. The method 800, similar to method 700 can be performed by any suitable combination of hardware or software but, in many embodiments, the method 800 is performed in whole or in part by an email client application that can be executed by a client device, such as described above. Example client devices include, but are not limited to: cellular phones; tablet computers; desktop computers; and the like.

The method 800 includes operation 802 at which an email message with an embed payload is received. Next, at operation 804, one or more content items and/or format characteristics of the message. In other words, at operation 804, the method 800 can extract one or more portions of the payload to inform the display and/or format of the message received at operation 802. Example format characteristics include, but are not limited to: font color; font size; border color; border size; font name; background color; format tags; format classes; and so on.

Serialized Objects as Embedded Payloads

Figure 9:
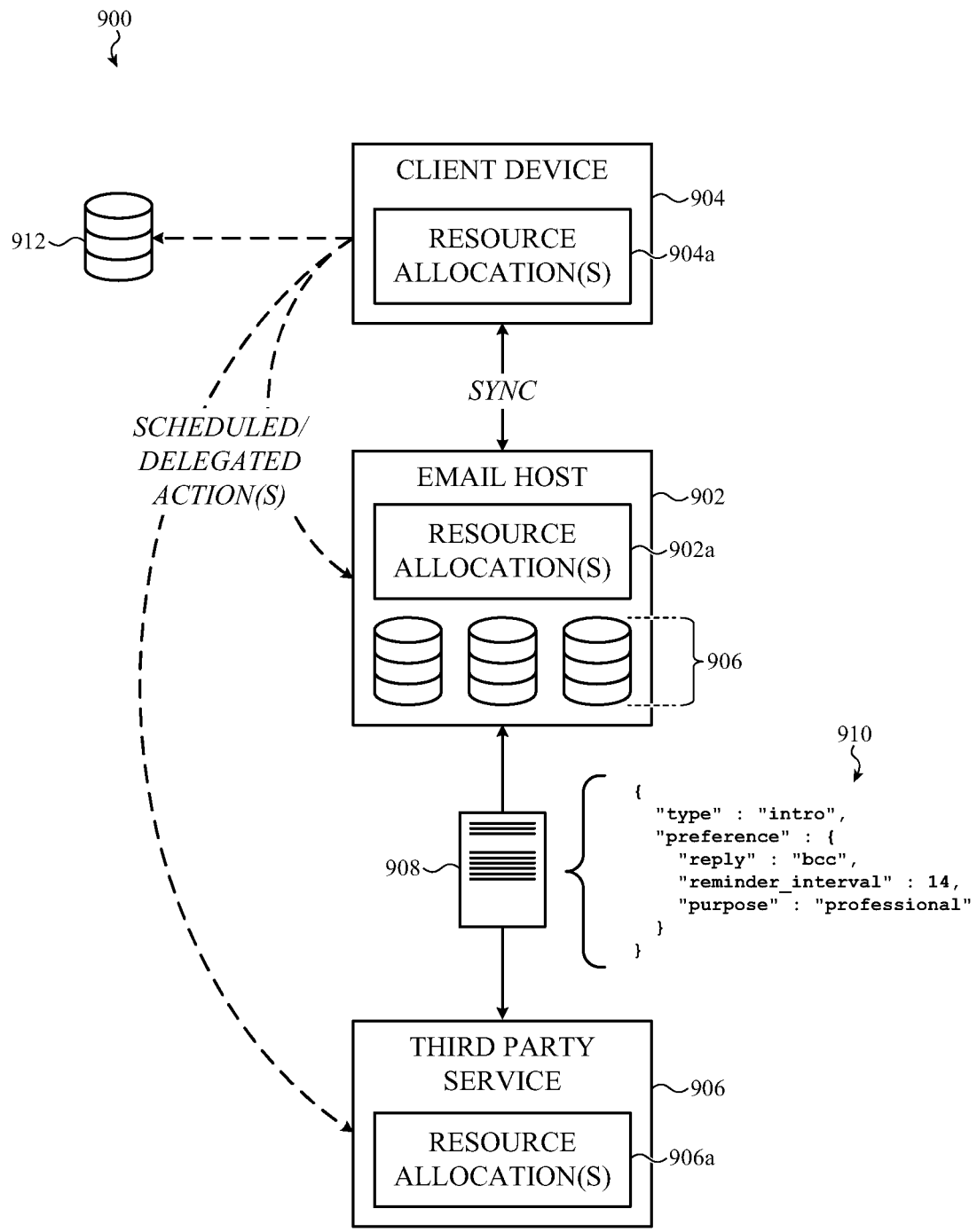
FIG. 9 depicts a system configured to send and receive emails that may include an actionable serialized object, such as described herein.

FIG. 9 depicts a system configured to transmit email messages to a recipient. An email sent via the system 900 can include an embedded serialized object such as described herein. In the illustrated example embodiment, the system 900 includes an email host server 902 which, in turn, is communicably coupled to both a client device 904 and a third-party server 906, also referred to herein as a sender server. The third-party server 906 can be further communicably coupled to another client device (not shown) from which the third-party server 906 can receive an email message such as described herein. In this architecture, the other client device (not shown) can be operated by a sender of the email message and the client device 904 can be operated by a recipient of that email. The third-party service 906, in this manner, is an email provider of the sender and the email host 902 is an email provider of the recipient.

More specifically, in many embodiments, the email host server 902 is communicably coupled to the third-party server 906 via one or more email message sending communication protocols, such as the Simple Mail Transfer Protocol ("SMTP"). Likewise, the sender's client device can be coupled to the third-party server 906 via SMTP. The email host server 902 is also communicably coupled to the client device 904, the recipient's client device, via one or more email message receipt communication protocols, such as the Internet Message Access Protocol ("IMAP"), the Post Office Protocol (e.g., "POP3"), or other protocols, such as Microsoft's Exchange/ActiveSync protocol.

As a result of this architecture, the third-party server 906 can generate and/or receive an email 908 that includes a serialized object 910, such as described herein, and can communicate the email 908 to the email host server 902 which may store the email 908 in a database, such as one of the databases 102a. In many examples, the email 908 is encrypted prior to being stored in the database, but this may not be required of all embodiments.

At a later time, the client device 904 (the recipient's client device) can submit a request to the email host server 902 to retrieve a copy of the email 908, served from one of the databases of the email host server 902. Thereafter, the client device 904 or more particularly a client application instance executed by the client device 904 can parse the email to extract an embedded serialized object, such as the serialized object 910, such as described herein. The serialized object 910 and/or its contents can be consumed by the client application of the client device 904 to perform and/or schedule one or more actions, such as described above or elsewhere herein. In some cases, the serialized object 910 can cause the client device 904 to perform a task involving the third-party server 906, the email host 902, or a remote database, such as the remote database 912.

For example, the serialized object 910 can cause the client device 904, in some embodiments, to send another email message leveraging the third-party server 906 as an SMTP server. In other cases, the serialized object 910 can cause the client device 904 to send a reply email via the email host 902 (e.g., the email host 902 acts as an SMTP server). In yet other examples, the serialized object 910 can cause the client device 904 to submit a query to a remote database, such as the remote database 912. As one example, the remote database 912 may be a database associated with a collaboration tool, such as described above, storing as one example status of one or more projects tracked by a project management service of the collaboration tool. In this example, the serialized object 910 can cause the client device 904 to query the project management server for a status update on a particular project tracked by that tool. Thereafter, the results of the query can be displayed via a graphical user interface of the client device 904. In this architecture, the email 908 triggers an automatic workflow that informs the recipient of that email a current status of a project of interest to that recipient.

It is appreciated that the foregoing embodiment depicted in FIG. 9 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each server or service of the system 900 of FIG. 9 can be implemented in a number of suitable ways. As illustrated, the email host server 902, the third-party server 906, and the client device 904 each includes one or more purpose-configured components, which may be either software or hardware.

In particular, it may be appreciated that although these functional elements are identified as separate and distinct devices (e.g., servers) that can each include allocations of physical or virtual resources (identified in the figure as the resource allocations 902b, 904a, and 906a respectively), such as one or more processors, memory, and/or communication modules (e.g., network connections and the like), that such an implementation is not required. More generally, it may be appreciated that the various functions described herein of a host server 902 can be performed by any suitable physical hardware, virtual machine, containerized machine, or any combination thereof.

The foregoing embodiment depicted in FIG. 9 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, as noted above, it may be appreciated that a serialized object embedded in an email can be leveraged for a number of purposes, some of which may invoke or provoke action by a recipient of email, some of which may be performed completely automatically and in the background.

Serialized Objects Defining Client Application Action(s)

Generally and broadly, FIGS. 10-14B are presented herein to illustrate several discrete example embodiments of systems described herein. In particular, each figure illustrates a client device that may be configured to render a graphical user interface defined, at least in part, by an instance of an email client application configured to generate and/or parse embedded serialized objects as described herein.

Although each of these figures illustrates an example client device as a desktop computer, it may be appreciated that this is merely one example. In other configurations and/or architectures, other electronic devices can be used including mobile devices, tablet devices, and wearable devices.

In addition, these figures follow an example use case involving three parties, each leveraging a respective one instance of an email client application on a respective one client device.

More specifically, FIGS. 10-14B follows an example interaction in which a first user leverages systems and methods described herein which, in turn, operate over existing an popular email communication protocols, to facilitate an introduction between a second user and a third user. As noted above, this example contemplates that the first user leverages a first client device executing a first instance of an email client application, the second user leverages a second client device executing a second instance of an email client application, and the third user leverages a third client device executing a third instance of an email client application. In some embodiments, each of the client devices may be the same type or class of electronic device (e.g., laptop computers), but this is not required. In other examples, each individual user may leverage a different class of electronic device. Similarly, in some embodiments each email client application may be a separate instance of the same client application, but this is not required. In other examples, different client applications (e.g., supported and/or developed by different entities) may be used.

Absent the advantages of systems described herein, the example interaction between the first user, second user, and third user in which the first user introduces the second user to the third user is a substantially manual process. Human error, tone misinterpretation, and response latency may prevent or delay the introduction intended by the first user between the second and third users. For example, by leveraging email in a conventional manner, the first user may reach out to both the second user and the third user to mutually introduce the two. In some circumstances, the second user and/or the third user may not readily notice the email from the first user and may have a delayed response; this may be interpreted by one or more users as rude or unprofessional behavior. In other examples, one or both of the second user or the third user may reply all to the introduction message, thereafter copying the first user to unnecessary planning emails exchanged between the second user and the third user. In still other examples, the first user may forget to follow up on his or her original message.

Embodiments described herein can be leveraged to substantially automate and/or normalize the communications between the first user, the second user, and the third user to facilitate a quick and efficient interaction between all three users. In particular, as noted above, the example interaction described in reference to FIGS. 10-14B follows the mutual introduction between the second user and the third user, initiated by the first user.

More specifically, the first user initially uses a graphical user interface (e.g., by selecting a button thereof, by accessing a menu item thereof, and so on) of the first client application to indicate that the first user intends to send an email with an embedded serialized object that facilitates an introduction between two persons. In response, the first client application generates a graphical user interface which the first user can use to select two or more persons to introduce. The first user can leverage this graphical user interface to select the second user and the third user. As one example, the graphical user interface may communicably couple (via a suitable API) to a contact directory, social media service, or professional media service. Thereafter the first user can select a graphical user interface button or other selectable item indicating that the first user has completed his or her selections and desires to proceed with mutually introducing all selected persons.

In many embodiments, the first client application can be further configured to generate a body and/or a subject of the email into which the serialized object is embedded. For example, the first client application can be configured to select from a set of introduction email templates a single email template. The selected email template may be selected and/or edited by the first user via the graphical user interface, although this is not required.

In response to these above-described selections, the first client device or, more particularly, the first client application can generate a serialized object and embed that serialized object into the body of an email to be sent to the second user and the third user. As noted above, the email may be drafted in whole or in part by the first user, whereas in other cases, the email is selected from a template. Once the email body/subject is selected, a serialized object such as described herein can be embedded therein.

The serialized object can be configured to provoke a number of selected behaviors at the second and third client applications. For example, in some embodiments, the serialized object can be configured to prevent the first user from being added to a reply-all message. More specifically, the serialized object can limit the second or third client applications such that if either the second or third user attempt to reply all to the email message, the first user's email address will be omitted or, in some cases, added only to a BCC address field.

In other cases, the serialized object can be configured to cause the second and third client applications to communicably couple and to share geographic location information, calendar information, contact information, or any other suitable information. Such information sharing between the second user and the third user can help facilitate a quick and efficient introduction between them.

In yet other examples, the serialized object can be configured to cause the second and/or third client applications to generate or customize a graphical user interface providing supplemental options or features to the second or third users. For example, in one embodiment, the serialized object can define that a "thank you" button should be rendered in the second or third client applications. After clicking the "thank you" button, an email message can be automatically generated and sent to the first user, as a reply. The reply email can be selected from a set of template emails including content thanking the first user for facilitating the introduction. In some examples, the reply email generated in response to engaging the "thank you" button can itself include an embedded serialized object that causes the first client application to show only a notification to the first user.

These preceding examples are not exhaustive of the behaviors that may be provoked or leveraged by a system as described herein. As such, and to facilitate a thorough understanding of one example interaction use case in which various user may share data, and/or more efficiently interact, by leveraging embedded serialized objects, FIGS. 10-14B are provided below.

Figure 10:
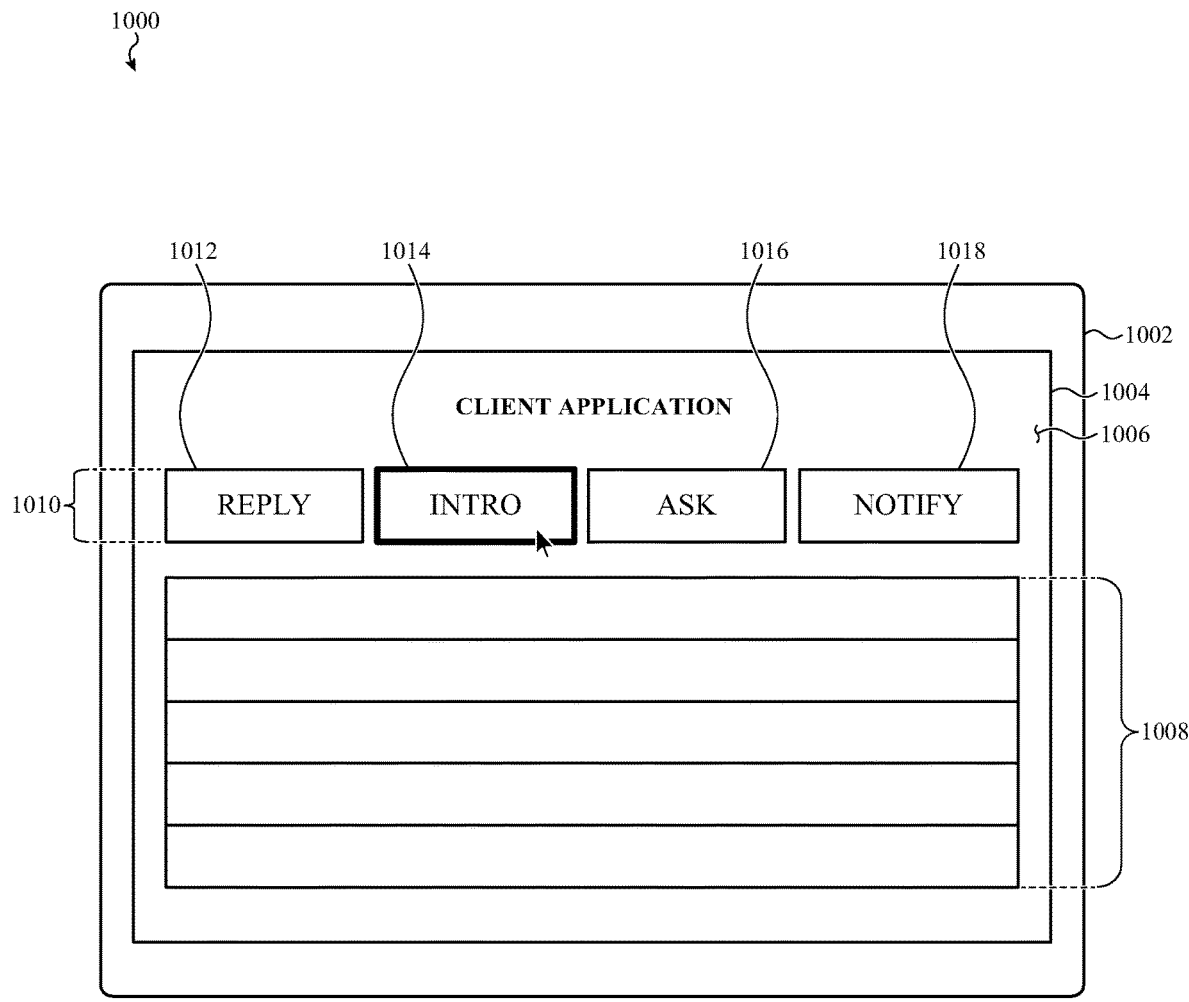
FIG. 10 depicts an example client device executing an instance of an email client application configured to embed an actionable serialized object into an email, such as described herein.

FIG. 10 depicts an example client device executing an instance of an email client application configured to embed an actionable serialized object into an email, such as described herein. In particular, a first client device 1000 includes a housing 1002 that encloses and supports a display 1004. The display 1004 can be leveraged by an instance of a an email client application to generate a graphical user interface 1006.

As noted above, the email client application (or, more simply, a client application) can be defined by executable code or instructions stored in a persistent memory of the first client device 1000. A processor of the first client device 1000 can be communicably coupled to the persistent memory and can access the persistent memory to load at least a portion of the executable code or instructions into a working memory in order to instantiate the client application. For simplicity of description, an instantiated client application is referred to herein, simply as a client application. For simplicity of illustration, the first client device 1000 is depicted without a processor, a working memory, or a persistent memory; it may be appreciated however that such components (also referred to as resource allocations with reference to FIG. 9) may be included within the housing or in another location.

The graphical user interface 1006 rendered by the client application is configured to present information related to emails received by a user of the first client device 1000. For example, the graphical user interface 1006 can present a message list 1008 and/or one or more actionable buttons 1010. The message list 1008, also referred to as an inbox, can display condensed information about messages recently received by the client application. The actionable buttons 1010 can be leveraged by the user to instruct the client application to perform one or more tasks, some of which may include generating and/or embedding a serialized object into an email draft. For example, as shown the actionable buttons 1010 include a reply button 1012. The reply button 1012 may be selected by a user in order to reply to a sender of a message received by the client application.

The actionable buttons 1010 can also include an introduction button 1014, which may be selected by a user in order to generate a message, such as described above, that includes an embedded serialized object configured to facilitate a mutual introduction between two or more selected recipients of the message. Examples of actions that may be performed, triggered, scheduled, delegated, or provoked by an embedded serialized object associated with the introduction button 1014 include but are not limited to: limiting to whom the email message may be forwarded; defining an encryption protocol or public key for use when reading or responding to the message; defining a particular SMTP server that should be used when responding to the message; setting a reply-to field of the message or any reply message; requiring at least one contact card attachment before a reply to the message can be sent; enforcing spellcheck before the message can be sent; accessing or sharing a calendar availability; and so on. It may be appreciated that these examples are not exhaustive; an introduction button as described herein can be associated with and/or can cause the embedding of a number of serialized objects.

The actionable buttons 1010 can also include an ask button 1016, which may be selected by a user in order to generate a message, such as described herein, that includes an embedded serialized object configured to cause a recipient electronic device/client application to render a graphical user interface with a limited set of selectable options. This button may be used to solicit a quick answer to a question, thereby improving the speed with which an email reply can be generated. For example, when a user presses the ask button 1016, the client application may be configured to generate a user interface through which the user can add one or more predetermined responses to a question that the user desires to ask of the intended recipient of the email.

For example, if the user intends to direct an email to a recipient asking whether to reschedule or cancel a meeting, the user can leverage the graphical user interface of the client device to add two predetermine responses. A first response reads "Cancel the meeting" and a second response reads "Reschedule for a later time." Each of the first response and the second response can be added to a serialized object that can be embedded into an email sent to the recipient. Upon receiving the message, with the embedded serialized object, the recipient's client application can render a graphical user interface including only two selectable items—a first item reading "Cancel the meeting" and a second item reading "Reschedule the meeting." By selecting one of these two options, the recipient can quickly respond to the sender's original message. In this manner, the sender of the message (e.g., a user of the client device 1000) can quickly solicit a response from a colleague, supervisor, client, vendor, or any other suitable person. These example embodiments can dramatically increase the speed with which information is exchanged between individuals via email.

The actionable buttons 1010 can also include a notify button 1018, which may be selected by a user in order to generate a message, such as described above, that includes an embedded serialized object configured to generate a notification, instead of displaying a message within the message list 1008.

Figure 11:
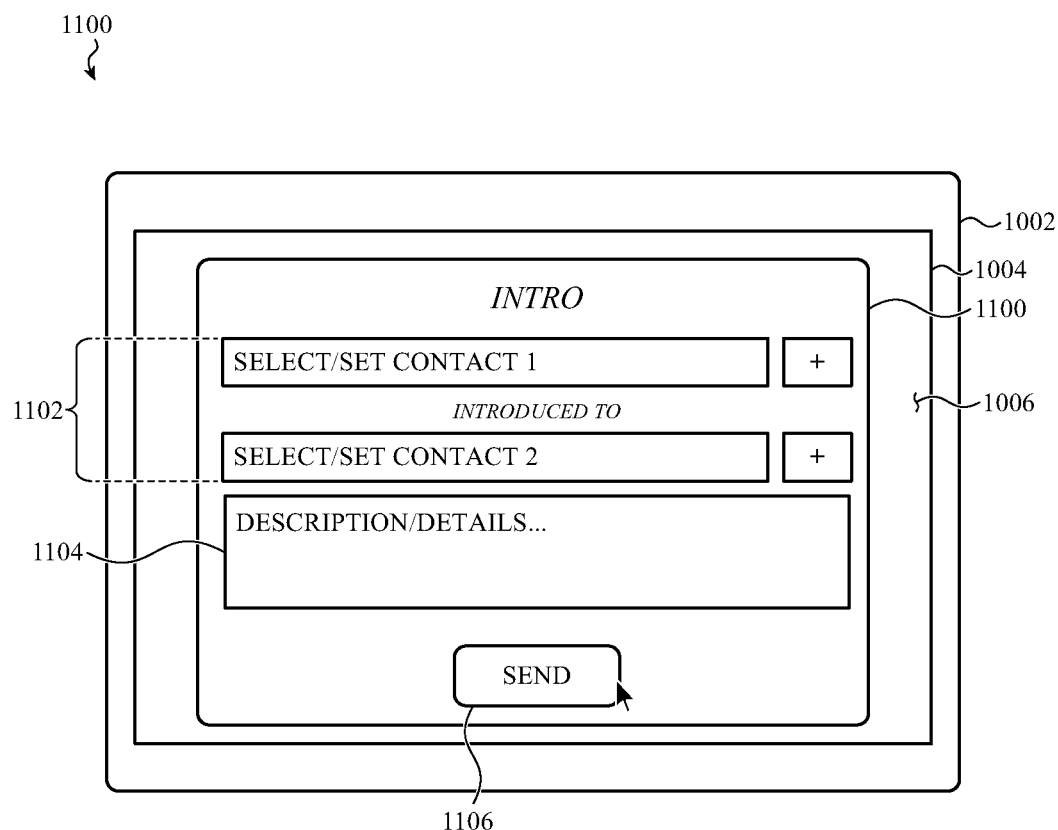
FIG. 11 depicts the client device and email client application of FIG. 10 displaying a graphical user interface configured to solicit user input leveraged to generate an actionable serialized object to embed into an email prior to sending.

In the illustrated embodiment, the introduction button 1014 is selected by a user, indicating a user intent to introduce at last two contacts to one another. FIG. 11 depicts the client device and email client application of FIG. 10 displaying a graphical user interface configured to solicit user input leveraged to generate an actionable serialized object to embed into an email prior to sending. In particular, the first client device 1000 (including, as noted above, a housing 1002, a display 1004 and a graphical user interface 1006 rendered by a client application), after having received input from the user selecting the introduction button 1014 (shown in FIG. 10), can display an overlay graphical user interface, shown in the figure as the graphical user interface 1100.

The graphical user interface 1100 can be specifically tailored to display options, parameters, and selections available to the user when facilitating an introduction. For example, as shown the graphical user interface 1100 can include a contact selection region 1102 that can be leveraged by the user in order to select or add contacts for mutual introduction. In addition, the graphical user interface can include a description area 1104 that can be used by the user in order to add additional context, such as a description of how the user is connected with each of the selected contacts identified in the contact select region 1102. Once information has been added to the user's satisfaction, the user can press a send button 1106 that, in turn, will send an email 1108 with an embedded serialized object (not shown), such as described herein. The email 1108 may be selected from a set of templates, and may include fields that can be populated with information derived from or otherwise extracted from the user's inputs to the graphical user interface 1100, such as email addresses of the selected contacts, names of the selected contacts, the first name and/or signature of the sender/user, background information describing a relationship between the user and one or more of the contacts, and so on. It may be appreciated that the foregoing example user interface elements are not exhaustive of the various types of elements that may be included in the graphical user interface 1100—in other embodiments, additional (or fewer) user interface elements may be shown.

Figure 12A:
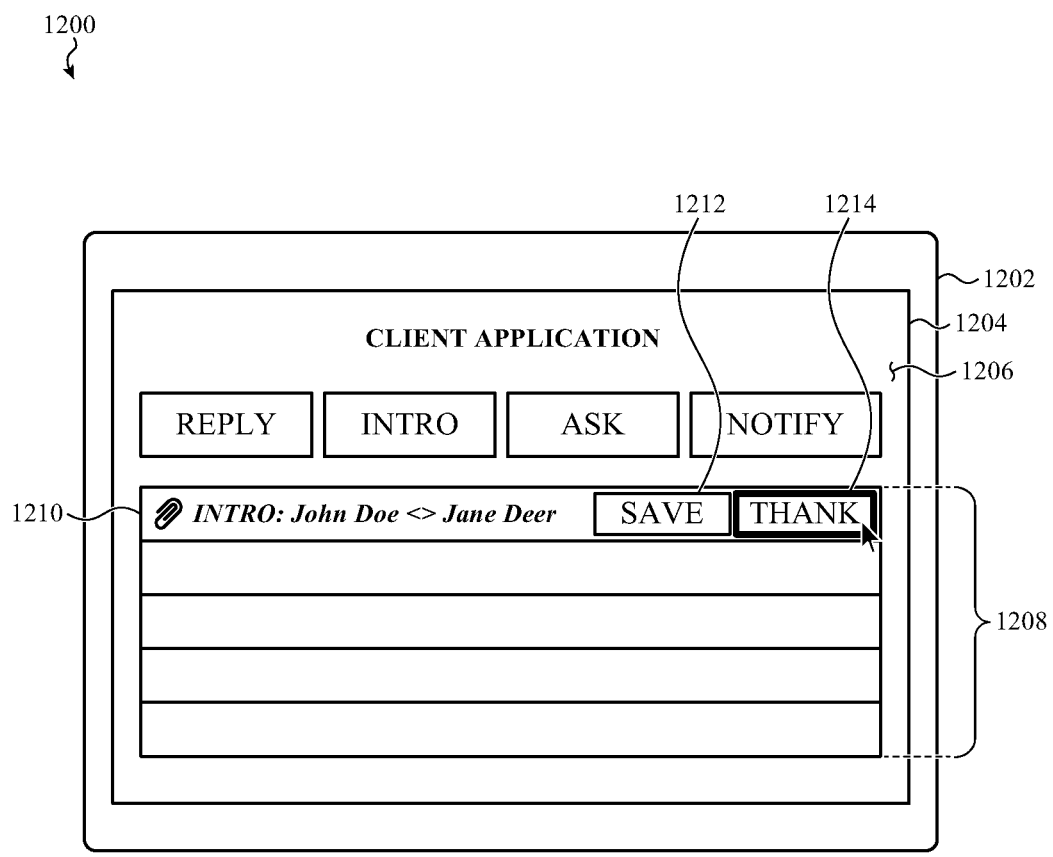
FIG. 12A depicts another client device executing an instance of an email client application having received the email of FIG. 11 and, in response, perform one or more actions defined by the actionable serialized object, such as generating an automated reply email.

As noted above, the client application may of the first client device 1000 can generate a serialized object to define one or more actions that can be performed by a recipient's (e.g., each of the contacts selected by the user from the graphical user interface 1100) client application. For example, FIG. 12A depicts another client device, a second client device 1200, executing an instance of an email client application having received the email 1108 shown in FIG. 11 and, in response, performing one or more actions defined by the actionable serialized object, such as generating an automated reply email and/or generating a graphical user interface element.

In particular, much like the first client device 1000, the second client device 1200 can include a housing 1202 enclosing and supporting a display 1204 that, in turn, can be leveraged by a processor, memory, and an instance of a client application to render a graphical user interface 1206. The graphical user interface 1206, as with the embodiment depicted in FIGS. 10-11 can include a message list, identified as the message list 1208. In the illustrated embodiment, the email 1108 sent by the first client device 1000 is shown as the email 1210.

The email 1210 includes an actionable serialized object, which as noted above may be embedded into an HTML body of the email 1210. In this example, the actionable serialized object sent from the client application of the first client device 1000 (see, e.g., FIGS. 10-11) can cause the client application of the second client device 1200 to render two additional, custom, user interface elements. In particular, as shown two additional user interface elements are shown atop the email 1210 within the message list 1208. It may a be appreciated, however, that this is merely one example implementation and that in other examples, another graphical user interface element or modification can be made.

In this example, two buttons are shown overlaid the email 1210. In particular, a first button 1214 is shown as a save button 1212 which, when selected by a user of the second client device 1200, can save the email 1210 and/or an attachment thereof (such as a contact card of another copied recipient of the email 1210) to a predetermined or selectable location.

The graphical user interface 1206 is also modified by the actionable serialized object embedded in the email 1210 to generate a thank button 1214. The thank button 1214 can be used by a user to automatically generate an email 1216, which may be defined and/or selected at least in part by the actionable serialized object embedded within the email 1210. The email 1216 can be populated with content extracted from or identified by the actionable serialized object embedded in the email 1210. In addition, the email 1216 can populate CC and BCC fields based, at least in part, on instructions provided by the actionable serialized object embedded in the email 1210.

For example, as shown, the email 1216 is not a reply message to the email 1210, but rather the client application of the second client device 1200 automatically adds the sender (the user of the first client device 1000) of the email 1210 to a BCC field, leaving only other recipients of the email 1210 in the CC field. This action of moving the sender to the BCC field can be defined by the actionable serialized object as generated by the client application of the first client device 1000, as shown in FIGS. 10-11. In this manner, more generally and broadly, serialized objects sent between different recipients can be chained, linked, derived from one another, or may build upon one another to architect a request-response system in which a first client device sends a request (e.g., an email with a first serialized object) to a second client device which returns a response (e.g., a reply with a second serialized object). In other cases, the first or second devices may generate response to a third electronic device via email or another communication channel.

In other examples, the user of the second client device 1200 may additionally or alternatively desire to directly coordinate with other recipients of the introduction email, the email 1210, sent by the user of the first client device. For example, the user of the second client device 1200 may prefer to leverage the ask button, such as the ask button 1016 (shown in FIG. 10) to directly solicit feedback from other recipients of the mutual introduction email, the email 1210.

Figure 12B:
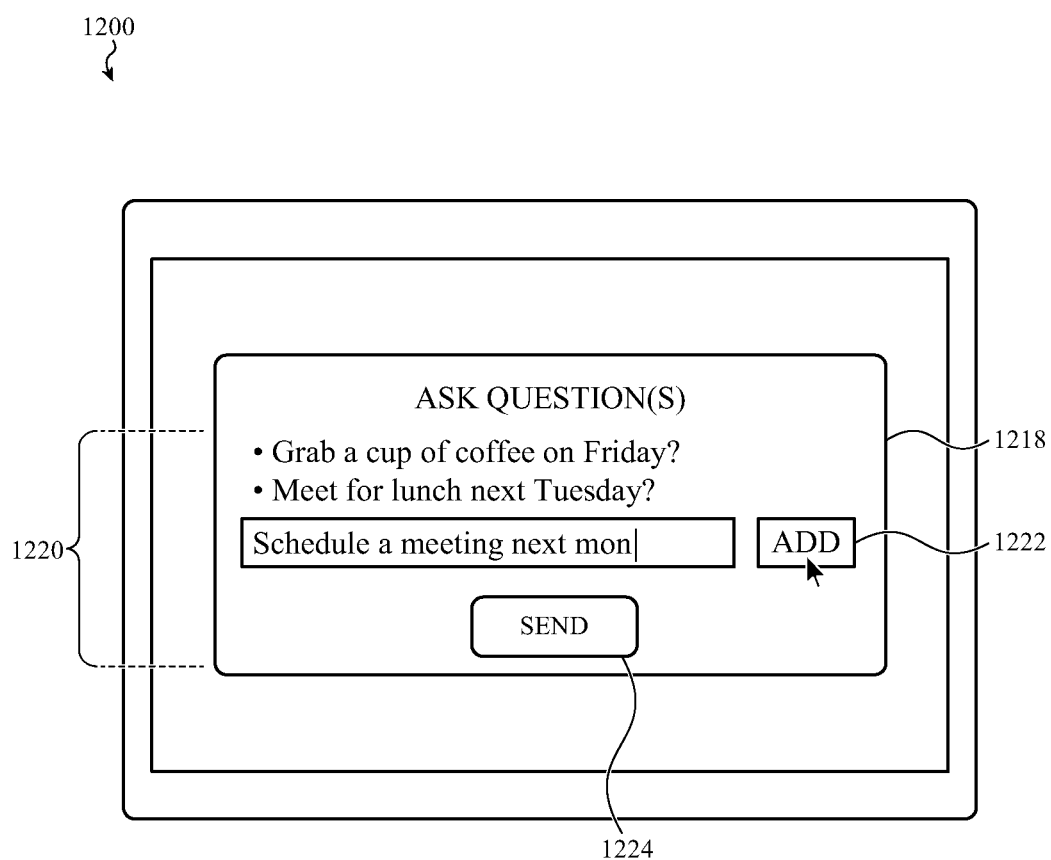
FIG. 12B depicts the example client device and email client application of FIG. 12A, the email client application displaying a graphical user interface configured to solicit user input leveraged to generate an actionable serialized object to embed into another email prior to sending.

For example, FIG. 12B depicts the example client device and email client application of FIG. 12A, the email client application displaying a graphical user interface configured to solicit user input leveraged to generate an actionable serialized object to embed into another email prior to sending.

More specifically, the second client device 1200, executing the client application discussed above with reference to FIG. 12A, can generate an overlaid graphical user interface labeled in the figure as the graphical user interface 1218. The graphical user interface 1218 can be configured to solicit and receive input from the user of the second client device 1200, such as options for meeting with another recipient of the email 1210. More particularly, the graphical user interface 1218 can include a survey data entry area 1220 that can be leveraged by the user of the second client device 1200 to add multiple options. As the user adds another option, the user may press an add button 1222 to signal that the user's input with respect to the most recently entered option is complete. Once the user has added all relevant or desired options, the user may press a send button 1224 to generate an email 1216 directed to other recipients of the original message, the email 1210. In many embodiments survey items can also be associated with particular formats or display preferences.

For example, a "positive response" to a survey question may be highlighted or shown in a green color, whereas a "negative response" may be shown in a red color. In other cases, a survey may request information related to approving expenses; high value approvals may be shown alongside several sequential currency icons or glyphs and low value approvals may be shown alongside fewer sequential currency icons or glyphs. In this example, different shades of green, or a graduated scale from green to red, may be used to visually emphasize difference between selectable options.

More generally, it may be appreciated that formatting options may be encoded into and/or included within an embedded serialized object, such as described herein.

Figure 13:
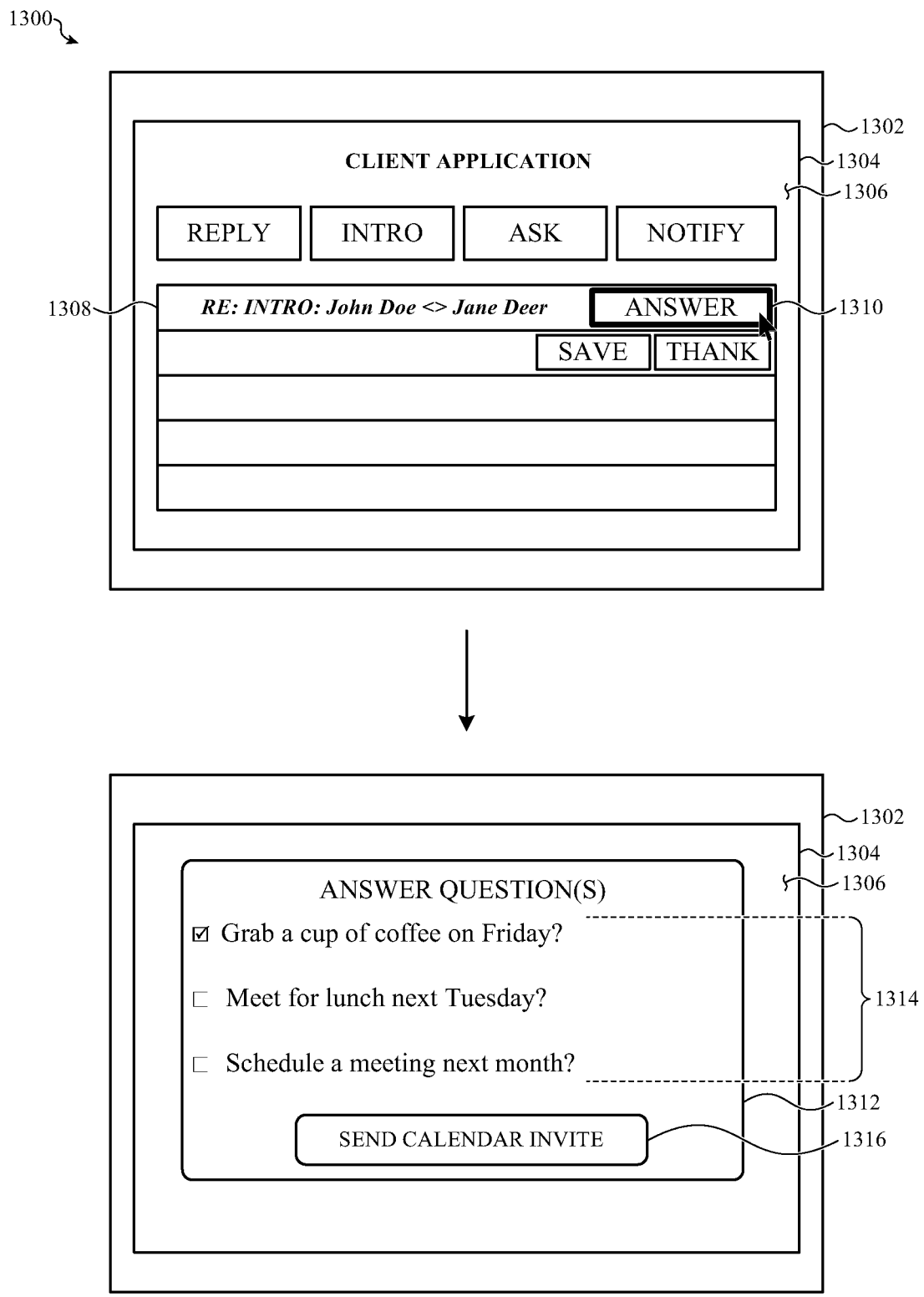
FIG. 13 depicts yet another client device executing an instance of an email client application having received the email of FIG. 12B and, in response, displaying a graphical user interface defined by the actionable serialized object.

As with other embodiments described herein the message 1226 can include an actionable serialized object that informs a recipient client application that the options selected by the user of the second client device 1200 should be displayed as a selectable list, and not as a standard email message. For example, FIG. 13 depicts yet another client device, a third client device 1300, executing an instance of an email client application having received the email 1226 of FIG. 12B (and the email 1108 of FIG. 11) and, in response, displaying a graphical user interface defined by the actionable serialized object.

More specifically, the third client device 1300, as with other embodiments described herein, can include a housing 1302 enclosing a display 1304 that, in turn, renders a graphical user interface. The graphical user interface 1306 can be defined, at least in part by a client application, such as described above, that is configured to receive and generate emails. In this example, the third client device, and in particular, the client application instance executing on the third client device 1300 receives and displays in a message list the email 1108 sent from the first client device 1000 (see, e.g., FIG. 11) and the email 1226 send from the second client device 1200. In particular, the email 1226 received from the second client device 1200 is identified as the email 1308.

As with other embodiments described herein the client application of the third client device 1300 can be configured to extract an actionable serialized object from the email 1108 sent from the first client device and, in response generate two buttons as shown (see also FIG. 12A). In addition, the client application of the third client device 1300 can be configured to extract another actionable serialized object from the email 1308 that defines a different graphical user interface modification. In particular, the email 1308 can include an actionable serialized object that causes the third client device 1308—and in particular the client application instance of the third client device 1308 to render an answer button 1310.

The answer button 1310, when selected by a user of the third client device renders a supplemental graphical user interface 1312 that includes a survey response area 1314, presenting options for response as defined in the actionable serialized object of the email 1308. After selecting an appropriate option, the user of the third client device 1300 can operate a button 1316 that, according to the actionable serialized object of the email 1308, returns a calendar invite to the sender of the email 1308, the user of the second client device (see, e.g., FIG. 12B).

Once the response email to the survey is selected by the user of the third client device 1300, the client application of that device generates a response email that, in turn, includes an actionable serialized object. In this case, the actionable serialized object may include an indication that the user of the third client device 1300 has selected a particular option presented by the user of the second client device 1200. More particularly, FIG. 14A the second client device 1200 having received the response email 1400 from the third client device 1300 (see, e.g., FIG. 13). An actionable serialized object can be extracted by the client application of the second client device 1200 and can cause that application to display a graphical user interface indicator 1402 clearly showing which option was selected by the user of the third client deice 1300. In many cases, the graphical user interface indicator 1402 may present only a portion of the option selected by the user of the third client device 1300, such as "Coffee" in place of "Meet for Coffee."

Figure 14A:
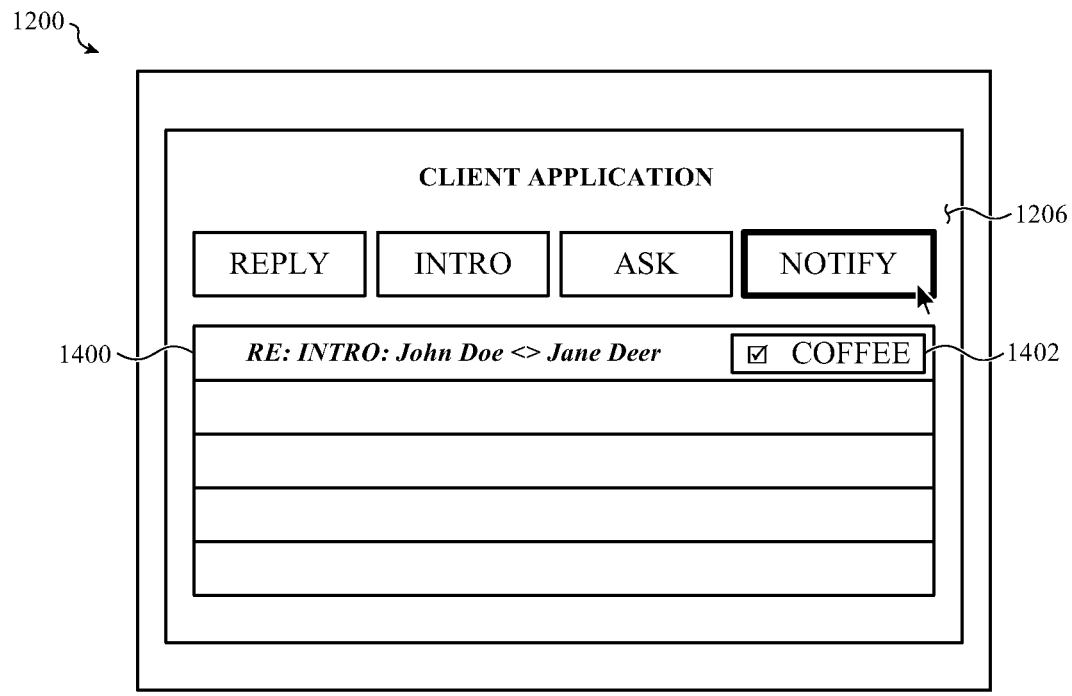
FIG. 14A depicts the example client device and email client application of FIG. 12A, the email client application having received the email of FIG. 13 and, in response, generating an automated reply email with an actionable serialized object defining how the automated replay should be displayed.
Figure 14B:
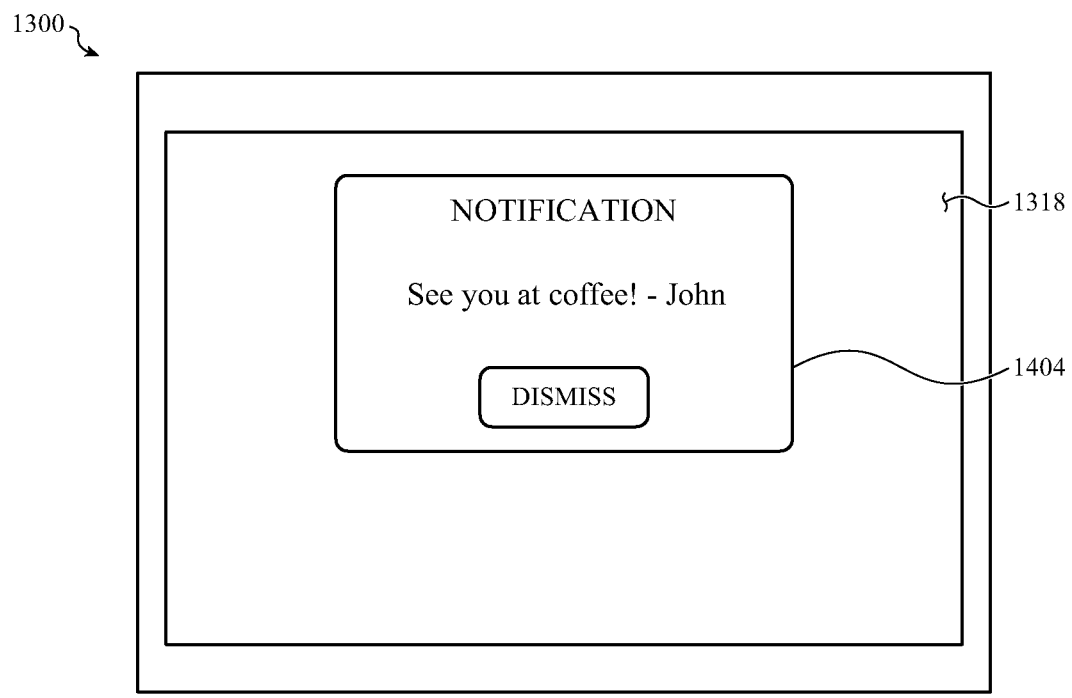
FIG. 14B depicts the example client device and email client application of FIG. 12A, the email client application having received the email of FIG. 14A and, in response, displaying a notification according to the actionable serialized object.

After having received the response email 1400 from the third client device 1300, the user of the second client device may desire to simply notify the user of the third client device 1300 that the user's selection was received. This action, as described above, can be performed by leveraging actionable serialized objects as described herein. In particular, the user of the second client device 1200 can select a notify button presented in the graphical user interface 1206. The notify button can automatically generate an email, including an actionable serialized object defining that the message should be shown only as a notification, and send that email to the user of the third client device 1300. FIG. 14B depicts the third client device 1300, hiding the message from a message list of the graphical user interface 1306, and instead presenting only a notification 1404.

These foregoing embodiments depicted in FIGS. 10-14B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Operations Associated with Serialized Objects in Email Messages

Figure 15:
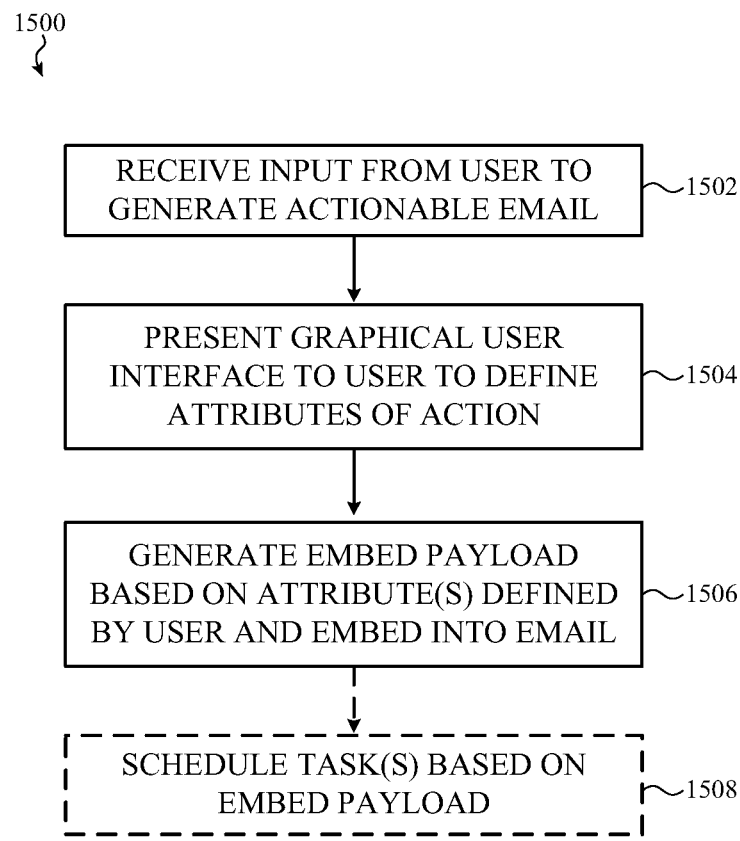
FIG. 15 is a flowchart depicting example operations of a method of embedding an actionable serialized object into an email, such as described herein.

FIG. 15 is a flowchart depicting example operations of a method of embedding an actionable serialized object into an email, such as described herein.

As with other embodiments described herein, the method can be performed in whole or in part by an instance of a client application executing on a client device. In particular, the method can be performed by one or more hardware resources of that client device, such as a processor and/or a memory. In particular implementations, a processor of the client device can be configured to access a working and/or persistent memory to obtain executable instructions or binary files that, when executed by the processor, instantiate at least a portion of the client application. The client application may be an email client application, such as described above, that is configured to receive email and send email. In addition, the client application instance may be configured to generate and/or extract one or more actionable serialized objects from email messages.

The instance can be configured to extract an actionable serialized object using any suitable method or combination of methods. In many embodiments, a serialized object is enclosed between custom tags within a document object model of an HTML-formatted email message body. In other examples. For example, the actionable serialized object may be a JSON object and/or Javascript function.

In many cases, the instance may be configured to execute a portion of the serialized object with an interpreter or compiler separate from the instance itself. In other cases, the serialized object(s) can include object data and/or data fields that can be extracted and/or typecast as particular variables or variable types.

Actionable serialized objects can be of any suitable object depth or tree structure; a flat object with a single attribute or single set of attributes distributed or arranged in key-value pairs is neither preferred nor implied.

In further embodiments, the instance can be configured to instruct a third party application or third party server, whether local or remote, to perform at least a portion of a task defined by an actionable serialized object.

In particular, the method 1500 includes operation 1502 at which input is received from a user to generate an actionable email, or as referred to herein, an email including an embedded/actionable serialized object. The method advances to operation 1504 at which a graphical user interface is presented to that user that solicits input from the user to select one or more properties of the action(s) to be associated with the actionable email. Examples include, but are not limited to: recipients of the associated email; a subject of the associated email; body content of the associated email; a notification preference; and so on.

The method 1500 advances to operation 1506 at which the instance, or another software process or hardware mechanism, generates an embed serialized object (also referred to as an "embedded serialized object") based on the attributes selected by the user at operation 1504. Once generated, the serialized object can be embedded into a header or other portion of a draft email.

Finally, the method 1500 optionally advances to 1508 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

Figure 16:
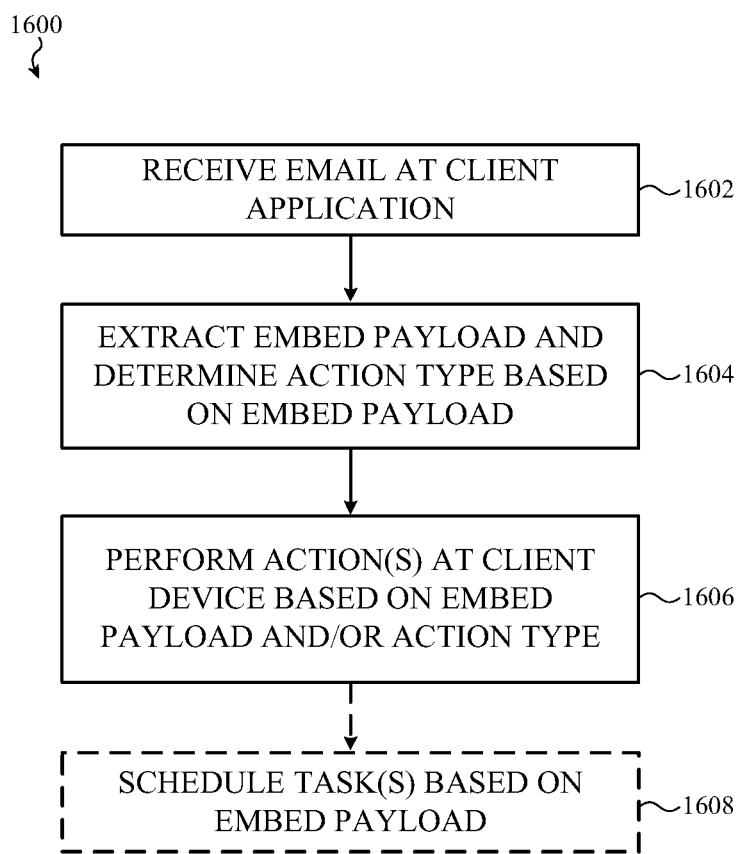
FIG. 16 is a flowchart depicting example operations of a method of performing one or more actions in response to receiving an email including an actionable serialized object, such as described herein.

FIG. 16 is a flowchart depicting example operations of a method of performing one or more actions in response to receiving an email including an actionable serialized object, such as described herein. The method can be performed by any suitable hardware or software combination, such as described above with reference to FIG. 15; this description and its various alternative constructions are not repeated.

The method 1600 includes operation 1602 at which an email is received at a client application. Thereafter, advancing to operation 1604, the client application can extract an actionable serialized object, also referred to as an "embed serialized object." The client application can be configured to extract eh serialized object from any suitable portion of the email, including the email body, the email subject line, the email headers, and so on. In some examples, portions of a serialized object may be found in different portions of an email; in other cases multiple serialized objects can be embedded. After extracting a serialized object, the method 1600 can advance to determine one or more action types, and/or one or more action attributes as defined in the actionable serialized object.

The method 1600 thereafter advances to operation 1606 at which one or more actions can be performed based on the information extracted and/or determined at operation 1604. Finally, the method 1600 optionally advances to 1608 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

Figure 17:
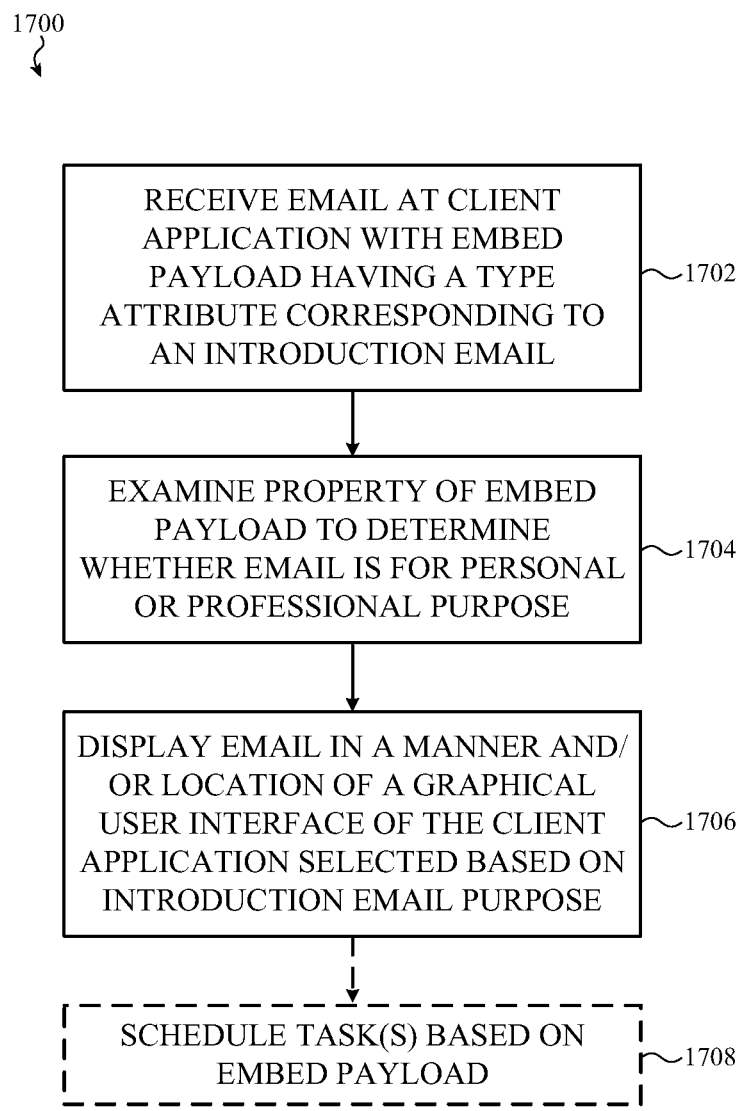
FIG. 17 is a flowchart depicting an example operation of a method of performing one or more actions in response to receiving an email including an actionable serialized object, such as described herein.

FIG. 17 is a flowchart depicting an example operation of a method of performing one or more actions in response to receiving an email including an actionable serialized object, such as described herein. The method can be performed by any suitable hardware or software combination, such as described above with reference to FIG. 15; this description and its various alternative constructions are not repeated.

The method 1700 includes operation 1702 at which an email is received at an email client. The email received can include an actionable serialized object having an action type associated with an introduction email.

The method 1700 thereafter advances to operation 1704, at which one or more properties or attributes of the serialized object embedded in the message received at operation 1702 can be examined. For example, in one embodiment, the method may determine whether the introduction email is intended for a personal or professional purpose. In this example, a key or data item within the actionable serialized object may identify whether the introduction email is intended for a professional or personal purpose. In other examples, semantic processing, natural language processing, and/or sentiment analysis can be leveraged for this determination.

The method next advances to operation 1706 at which the received email is displayed in a particular manner (e.g., in a particular location) based on the introduction email purpose. As a result of this construction, introduction emails are substantially more likely to be acted upon as the introduction email is unlikely to be lost among a long message list of unrelated messages.

Finally, as described in reference to other methods presented herein, the method 1700 optionally advances to 1708 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

Figure 18:
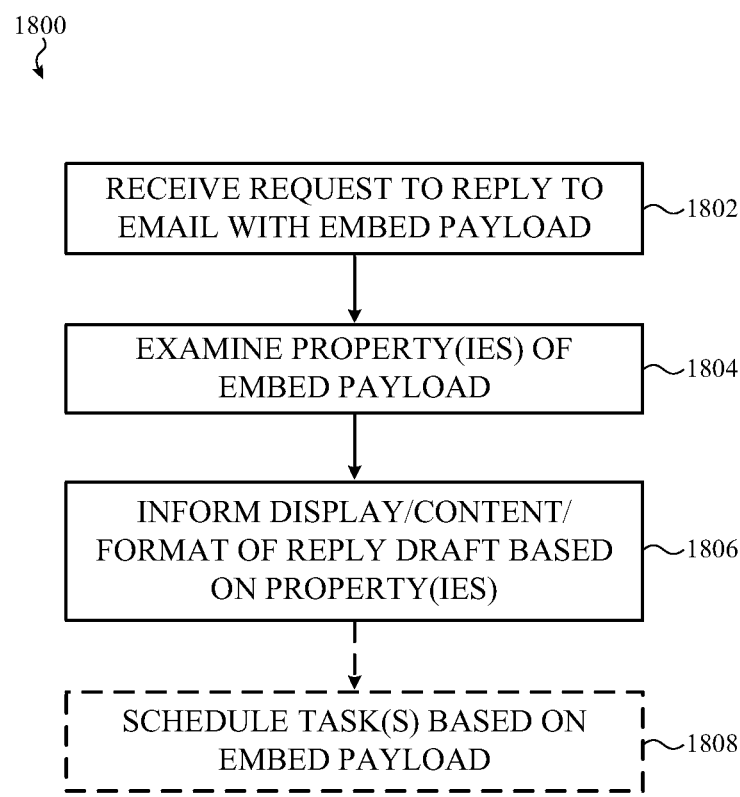
FIG. 18 is a flowchart depicting an example operation of a method of performing one or more actions in response to receiving an email including an actionable serialized object, such as described herein.

FIG. 18 is a flowchart depicting an example operation of a method of performing one or more actions in response to receiving an email including an actionable serialized object, such as described herein. The method can be performed by any suitable hardware or software combination, such as described above with reference to FIG. 15; this description and its various alternative constructions are not repeated.

The method 18000 includes operation 18002 in which a request to reply to a message including an actionable serialized object is received. Next at operation 18004, one or more properties of the embedded serialized object are examined. Next, at operation 18006, the reply message—or more precisely a draft email generated to reply to the message—may be modified based, at least in part, on the embed serialized object. For example, the embed serialized object may define that all replies should be directed to BCC and not to a CC line. In another example, the embed serialized object may define that all replies to the sender should themselves include an actionable serialized object to cause the sender's email client to display the reply message as a notification. These examples are not exhaustive, and other examples are possible.

Finally, as described in reference to other methods presented herein, the method 18000 optionally advances to 18008 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to receive email and/or send email as described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, recipient terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A client device configured to communicate with an email server, the client device comprising:
a display configured to render a graphical user interface, the graphical user interface defining:
a category selection region comprising a plurality of selectable categories; and
a content display region configured to display content items associated with a selected category;
a memory storing executable instructions; and
a processor configured access the memory and to execute the executable instructions to instantiate a client application, the client application configured to perform the operations of:
receiving a plurality of email messages from the email server;
for a first email message of the plurality of email messages:
analyzing the first email message to determine a class of message of the first email message;
selecting a first parser associated with the class of message of the first email message, the first parser configured to extract data items of a first content type from email messages;
providing the first email message as input to the first parser;
receiving, as output from the first parser, a first extracted data item of the first content type;
selecting a first category from the plurality of selectable categories based on the first extracted data item; and
updating the content display region to display in a first display format, in conjunction with content items of the selected first category, the first extracted data item, while suppressing display of the first email message in a message list; and
for a second email message of the plurality of email messages:
analyzing the second email message to determine a class of message of the second email message;
selecting a second parser associated with the class of message of the second email message and configured to extract data items of a second content type from email messages, the second content type different from the first content type;
providing the second email message as input to the second parser;
receiving, as output from the second parser, a second extracted data item of the second content type;
selecting a second category from the plurality of selectable categories based on the second extracted data item; and
updating the content display region to display in a second display format different from the first display format, in conjunction with content items of the selected second category, the second extracted data item, while suppressing display of the second email message in the message list.

2. The client device of claim 1, wherein:
the content display region associated with the first category is configured to display only information of the first content type.

3. The client device of claim 2, wherein the first content type comprises one of a group consisting of:
financial data;
package tracking data; and
article content data.

4. The client device of claim 2, wherein the first extracted data item is aggregated with other information of the first content type.

5. The client device of claim 1, wherein the client application is configured to select the first and second parsers from a set of parsers.

6. The client device of claim 1, wherein the message list is an email inbox.

7. The client device of claim 1, wherein the client application is configured to extract a serialized object from the first email message after receiving the first email message from the email server.

8. The client device of claim 7, wherein the serialized object comprises an executable instruction to be performed by one of the client device or the client application.

9. The client device of claim 7, wherein the client application is configured to change the graphical user interface at least in part based on the serialized object.

10. A method of displaying information received at a client device from an email server, the method comprising:
receiving an email message from the email server;
analyzing the email message to determine a class of message of the email message;
selecting an email content parser based on the class of message of the email message;
receiving, as output from the selected email content parser, a set of extracted data items from the email message;
for a first data item of the set of extracted data items:
determining that the first data item is of a first content type; and
associating the first data item with other data items of the first content type;
for a second data item of the set of extracted data items:
determining that the second data item is of a second content type different from the first content type; and
associating the second data item with other data items of the second content type;
displaying, in a graphical user interface, a first content display region associated with the first content type in a first display format, and a second content display region associated with a second content type in a second display format different from the first display format, while suppressing display of the email message in a message list;
updating the first content display region to include the first data item; and
updating the second content display region to include the second data item.

11. The method of claim 10, wherein the first content type of the first data item is selected from the group consisting of:
   financial data;
   shopping data;
   coupon data; and
   software as a service data.

12. The method of claim 10, wherein the class of message of the email message is selected from the group consisting of:
   an ecommerce email class;
   a newsletter class; and
   a software as a service notification.

13. The method of claim 10, wherein:
   the email content parser is a first email content parser;
   the set of extracted data items is a first set of extracted data items; and
   the method further comprises:
      selecting a second email content parser based on the class of message of the email message; and
      parsing the email message with the second email content parser to obtain a second set of data items.

14. The method of claim 10, wherein the first content display region is associated with a content type selected from the group consisting of:
   financial data;
   newsletter data;
   shopping data;
   coupon data; and
   software as a service data.

15. A client device configured to communicate with an email host server, the client device comprising:
   a display configured to render a graphical user interface, the graphical user interface defining:
      a category selection region comprising a plurality of selectable categories; and
      a content display region configured to display content items associated with a selected category;
   a memory storing executable instructions; and
   a processor configured to access the memory and to execute the executable instructions to instantiate a client application, the client application configured to perform the operations of:
      receiving from the email host server a message file comprising a tag, the tag identifying an embedded payload in the message file;
      suppressing display of the message file in a message list;
      in response detecting the tag:
         updating a first content display region of the graphical user interface to include, in a first display format, a first data item extracted from the embedded payload, the first content display region associated with a first category of the plurality of selectable categories; and
         updating a second content display region of the graphical user interface to include, in a second display format different from the first display format, a second data item extracted from the embedded payload, the second content display region associated with a second category of the plurality of selectable categories.

16. The client device of claim 15, wherein the embedded payload includes an instruction to suppress display of the message file from a message list.

17. The client device of claim 15, wherein the embedded payload includes an executable instruction that can be performed by one of the client application or the client device.

18. The client device of claim 17, wherein the executable instruction causes the client application to render a notification to a user of the client device.

19. The client device of claim 17, wherein the executable instruction causes the client application to generate a response to the message file.

* * * * *